(12) United States Patent
Nishiguchi et al.

(10) Patent No.: US 8,439,495 B2
(45) Date of Patent: May 14, 2013

(54) INK JET LIQUID COMPOSITION, SET, LIQUID CARTRIDGE, AND INK JET RECORDING METHOD

(75) Inventors: Kenji Nishiguchi, Yokohama (JP); Sachie Furukawa, Tokyo (JP); Katsuhiro Hayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/216,989

(22) Filed: Aug. 24, 2011

(65) Prior Publication Data

US 2012/0050391 A1 Mar. 1, 2012

(30) Foreign Application Priority Data

Aug. 31, 2010 (JP) ................................. 2010-193842

(51) Int. Cl.
*G01D 11/00* (2006.01)
(52) U.S. Cl.
USPC ...................................... 347/100; 106/31.28
(58) Field of Classification Search .................... 347/95, 347/100; 106/31.28, 31.58, 31.6, 31.86
See application file for complete search history.

(56) References Cited

U.S. PATENT DOCUMENTS 5,173,112 A 12/1992 Matrick et al.
2009/0169761 A1 7/2009 Szajewski

FOREIGN PATENT DOCUMENTS

JP 2001-039006 A 2/2001
JP 2006-272934 A 10/2006
WO 2008/130625 A1 10/2008

*Primary Examiner* — Lamson Nguyen
(74) *Attorney, Agent, or Firm* — Canon U.S.A., Inc., IP Division

(57) ABSTRACT

An ink jet liquid composition which is used with an ink containing a pigment and which contains an ABC triblock polymer formed from an A block having an aryl group, a B block having a unit represented by the general formula (1), and a C block having a unit represented by the general formula (2), wherein an acid value of the polymer is 20 mgKOH/g or more and less than 150 mgKOH/g, the ratio of the number average molecular weight of the polymer to the acid value is 50 or more and 200 or less, the proportion of the A block in the polymer is 20.0 percent by mass or more and 80.0 percent by mass or less and is 5.0 times or more and 15.0 times or less the proportion of units derived from all acidic monomers contained in the polymer.

General formula (1)

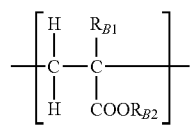

General formula (2)

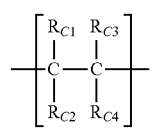

9 Claims, No Drawings

INK JET LIQUID COMPOSITION, SET, LIQUID CARTRIDGE, AND INK JET RECORDING METHOD

BACKGROUND OF THE INVENTION

1. Field of the Invention

The present invention relates to an ink jet liquid composition, a set by using the above-described liquid composition, a liquid cartridge, and an ink jet recording method.

2. Description of the Related Art

In the case where recording on a recording medium is performed while a pigment ink is used, the reflected light intensity of a recording region having a pigment layer formed through accumulation of pigments is different from that of a non-recording region not having a pigment layer and, thereby, gloss unevenness occurs in an image. In particular, this gloss unevenness occurs remarkably with respect to a recording medium, e.g., glossy paper, having high surface smoothness.

In order to solve this, methods in which recording is performed by using a set of a liquid composition not containing a coloring material and a pigment ink have been proposed previously (refer to Japanese Patent Laid-Open No. 2001-039006 and Japanese Patent Laid-Open No. 2006-272934). Japanese Patent Laid-Open No. 2001-039006 discloses an invention in which an image is formed by a pigment ink and, thereafter, a topcoat is applied all over the recording surface of a recording medium by spraying a liquid composition containing a polymer emulsion. It is disclosed that the reflected light intensity is thereby leveled all over the recording surface of the recording medium and the glossiness of the image is improved. Japanese Patent Laid-Open No. 2006-272934 discloses an invention in which in recording by using a liquid composition containing a polymer-dispersing pigment ink and an urethane polymer emulsion, the amount of ejection of the liquid composition is adjusted in such a way that the amount of application of the polymer (total amount of dispersing polymer and urethane polymer) per unit area becomes uniform. It is disclosed that a polymer layer is formed thereby in a non-recording region not having a pigment layer, a difference in reflected light intensity between the recording region having a pigment layer and the non-recording layer not having a pigment layer is reduced, and the gloss property and the gloss evenness of the image are improved.

SUMMARY OF THE INVENTION

An ink jet liquid composition according to aspects of the present invention is used in combination with an ink including a pigment, wherein a ratio $A_{max}/A_{min}$ of the maximum absorbance $A_{max}$ to the minimum absorbance $A_{min}$ of the above-described liquid composition in a wavelength range of 400 nm to 780 nm is 1.0 or more and 2.0 or less, the above-described liquid composition contains an ABC triblock polymer, the above-described ABC triblock polymer is formed from an A block having an aryl group, a B block having a unit represented by the following general formula (1), and a C block having a unit represented by the following general formula (2), an acid value of the above-described ABC triblock polymer is 20 mgKOH/g or more and less than 150 mgKOH/g, the ratio of the number average molecular weight of the above-described ABC triblock polymer to the acid value of the above-described ABC triblock polymer is 50 or more and 200 or less, the proportion (percent by mass) of the above-described A block in the above-described ABC triblock polymer is 20.0 percent by mass or more and 80.0 percent by mass or less relative to a total mass of the above-described ABC triblock polymer, and the proportion (percent by mass) of the above-described A block in the above-described ABC triblock polymer is 5.0 times or more and 15.0 times or less the proportion (percent by mass) of units derived from all acidic monomers contained in the above-described ABC triblock polymer,

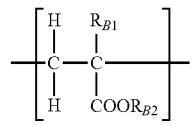

General formula (1)

in the general formula (1), $R_{B1}$ represents a hydrogen atom or a methyl group and $R_{B2}$ represents an alkyl group having the carbon number of 1 to 8, a cycloalkyl group having the carbon number of 4 to 8, or a hydroxy alkyl group having the carbon number of 2 to 8, and

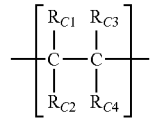

General formula (2)

in the general formula (2), at least one of $R_{C1}$ to $R_{C4}$ is a —COOH group, an —$R_{C5}$—COOH group, or a salt thereof, the remainder is a hydrogen atom, an alkyl group having the carbon number of 1 to 8, or a cycloalkyl group having the carbon number of 4 to 8, and $R_{C5}$ is an alkylene group having the carbon number of 1 to 5.

Further features of the present invention will become apparent from the following description of exemplary embodiments.

DESCRIPTION OF THE EMBODIMENTS

Aspects of the present invention will be described below in detail with reference to embodiments. An ink jet liquid composition (hereafter referred to as a "liquid composition") according to aspects of the present invention is used in combination with an ink including a pigment, wherein a ratio $A_{max}/A_{min}$ of the maximum absorbance $A_{max}$ to the minimum absorbance $A_{min}$ of the above-described liquid composition in a wavelength range of 400 nm to 780 nm is 1.0 or more and 2.0 or less, the above-described liquid composition contains an ABC triblock polymer, the above-described ABC triblock polymer is formed from an A block having an aryl group, a B block having a unit represented by the following general formula (1), and a C block having a unit represented by the following general formula (2), an acid value of the above-described ABC triblock polymer is 20 mgKOH/g or more and less than 150 mgKOH/g, the ratio of the number average molecular weight of the above-described ABC triblock polymer to the acid value of the above-described ABC triblock polymer is 50 or more and 200 or less, the proportion (percent by mass) of the above-described A block in the above-described ABC triblock polymer is 20.0 percent by mass or more and 80.0 percent by mass or less relative to a total mass of the above-described ABC triblock polymer, and the proportion (percent by mass) of the above-described A block in the above-described ABC triblock polymer is 5.0 times or more and 15.0 times or less the proportion (percent by mass) of units derived from all acidic monomers contained in the above-described ABC triblock polymer. By the way, at least a part of components constituting salts may dissociate in a liquid composition and be present as ions. However, in the present invention, this is included in the expression of "salt is contained" for the sake of convenience.

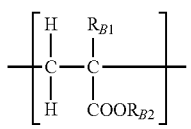

General formula (1)

In the general formula (1), $R_{B1}$ represents a hydrogen atom or a methyl group and $R_{B2}$ represents an alkyl group having the carbon number of 1 to 8, a cycloalkyl group having the carbon number of 4 to 8, or a hydroxy alkyl group having the carbon number of 2 to 8.

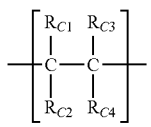

General formula (2)

In the general formula (2), at least one of $R_{C1}$ to $R_{C4}$ is a —COOH group, an —$R_{C5}$—COOH group, or a salt thereof, the remainder is a hydrogen atom, an alkyl group having the carbon number of 1 to 8, or a cycloalkyl group having the carbon number of 4 to 8, and $R_{C5}$ is an alkylene group having the carbon number of 1 to 5.

According to study by the present inventors, regarding the liquid composition containing the polymer emulsion in the related art, the glossiness and the gloss unevenness of the image were improved, but the storage stability, the ejection stability, and the like of the liquid composition were insufficient. For example, the polymer emulsion contained in the liquid composition in Japanese Patent Laid-Open No. 2001-039006 and Japanese Patent Laid-Open No. 2006-272934 had low water solubility. Consequently, it was found that the storage stability and the ejection stability of the liquid composition were insufficient.

As described above, regarding the liquid composition containing the polymer emulsion, in the case where improvements of the glossiness and the gloss unevenness are intended, the storage stability and the ejection stability of the liquid composition become insufficient. Then, the present inventors studied liquid compositions containing water-soluble polymers. In the case where a liquid composition containing a water-soluble polymer was used, the storage stability and the ejection stability of the liquid composition were improved. However, the water-soluble polymer permeated into a recording medium together with water and a water-soluble organic solvent in the ink easily. Therefore, a sufficient polymer layer was not able to be formed by a usual amount of application of the liquid composition, and the reflected light intensity on the surface of the recording medium was not able to be leveled. Consequently, the glossiness and a reduction in gloss unevenness became insufficient. That is, in order to form a polymer layer capable of leveling the reflected light intensity on the surface of the recording medium by using the liquid composition containing a water-soluble polymer, it was necessary to apply large amounts of liquid composition to the recording medium. However, in this case, the amount of application of the liquid composition was too large, so that the fixability was not sufficient. As described above, regarding the liquid composition in the related art, there was a relationship of trade-off between an improvement in the gloss property (high glossiness and a reduction in gloss unevenness) of the image and high storage stability and ejection stability.

In consideration of the above-described results, the present inventors studied the problem over and over again, and it was found that in the case where a specific ABC triblock polymer was contained in the liquid composition, the compatibility between an improvement in the gross property of the image and high ejection stability and storage stability of the liquid composition, which had been in the relationship of trade-off previously, was able to be ensured. The specific ABC triblock polymer used for the liquid composition according to aspects of the present invention is concretely an ABC triblock polymer formed from the A block having an aryl group, the B block represented by the above-described general formula (1), and the C block represented by the above-described general formula (2).

In the ABC triblock polymer used for the liquid composition according to aspects of the present invention, the A block is a high-hydrophobicity block, and the C block is a high-hydrophilicity block. Furthermore, a block having the hydrophobicity lower than that of the A block and the hydrophilicity lower than that of the C block is included as the B block between the A block and the C block. The ABC triblock polymer used for the liquid composition according to aspects of the present invention has a structure in which a hydrophobic segment and a hydrophilic segment are present together. Consequently, in water, some polymers are associated due to the hydrophobic interaction through the hydrophobic A block and are present with a hydrophobic segment inside and a hydrophilic segment outside. Therefore, the polymers can be present in the liquid composition stably. Furthermore, in application to the recording medium, some polymers are associated, as described above, and are present having a large size to some extent. Consequently, permeation into the recording medium does not occur easily, polymers are held on the recording medium easily and, thereby, a polymer layer sufficient for leveling the reflected light intensity on the surface of the recording medium can be formed.

At this time, in the case where an AC diblock polymer, in which the A block and the C block are directly bonded without through the B block, is used in contrast to the ABC triblock polymer used for the ink according to aspects of the present invention, the above-described effect is not obtained. The reason for this is believed to be that in the case where the AC diblock polymer is used, the hydrophobic A block and the hydrophilic C block are present very close to each other and, thereby, two contrary properties of the hydrophilicity and the hydrophobicity are not exerted favorably in a functionally separated manner.

The present inventors studied the problem over and over again, and it was found that the compatibility between an improvement in the gross property of the image and high ejection stability and storage stability of the liquid composition, which had been in the relationship of trade-off previously, was able to be ensured at a high level only after all the following Conditions (1) to (4) were satisfied.

Condition (1)

According to the present invention, it is provided that the proportion (percent by mass) of the A block in the ABC triblock polymer is 20.0 percent by mass or more and 80.0 percent by mass or less relative to a total mass of the ABC triblock polymer. If the proportion is less than 20.0 percent by mass, the hydrophobic segments are reduced so that the ABC triblock polymers do not associate easily. Then, in application to the recording medium, the ABC triblock polymer permeates into the recording medium easily, so that the gloss property of the image is not obtained. On the other hand, if the proportion is more than 80.0 percent by mass, the hydrophobic interaction is enhanced and the ABC triblock polymers form aggregates, so that the storage stability and the ejection stability of the liquid composition are not obtained.

Condition (2)

According to aspects of the present invention, it is provided that the acid value of the ABC triblock polymer used for the liquid composition according to aspects of the present invention is 20 mgKOH/g or more and less than 150 mgKOH/g. If the acid value is less than 20 mgKOH/g, the hydrophilicity is weakened, the hydrophobic interaction is enhanced relatively, and the ABC triblock polymers form aggregates, so that the storage stability and the ejection stability of the liquid composition are not obtained. If the acid value is 150 mgKOH/g or more, the hydrophilicity of the ABC triblock polymer is enhanced and in application to the recording medium, the ABC triblock polymer permeates into the recording medium easily, so that the gloss property of the image is not obtained.

Condition (3)

The hydrophilicity of the ABC triblock polymer used for the liquid composition according to aspects of the present invention can be evaluated on the basis of the ratio (Mn/acid value) of the number average molecular weight (Mn), in terms of polystyrene, obtained by GPC of the ABC triblock polymer to the acid value. That is, a small molecular weight (Mn), which represents the size of the polymer, relative to the acid value correlated with the number of anionic groups in the molecule indicates high hydrophilicity, and a large value indicates low hydrophilicity. In aspects of the present invention, it is provided that the value of Mn/acid value is 50 or more and 200 or less. If the value of Mn/acid value is less than 50, the molecular weight of the ABC triblock polymer is small relative to the acid value, so that the hydrophilicity of the ABC triblock polymer is too high and the gloss property of the image is not obtained. If the Mn/acid value is more than 200, the hydrophilicity of the triblock polymer is too low, so that the storage stability and the ejection stability of the liquid composition are not obtained.

Condition (4)

According to aspects of the present invention, it is provided that the proportion (percent by mass), relative to a total mass of the ABC triblock polymer, of the A block in the ABC triblock polymer used for the liquid composition according to the present invention is 5.0 times or more and 15.0 times or less the proportion (percent by mass) of units derived from all acidic monomers contained in the ABC triblock polymer. If the proportion is less than 5.0 times, the hydrophilicity of the ABC triblock polymer is enhanced and in application to the recording medium, the ABC triblock polymer permeates into the recording medium easily, so that the gloss property of the image is not obtained. If the proportion is more than 15.0 times, the hydrophilicity is weakened, the hydrophobic interaction is enhanced relatively, and the ABC triblock polymers form aggregates, so that the storage stability and the ejection stability of the liquid composition are not obtained.

On the basis of the above-described mechanism, the compatibility between an improvement in the gross property (high glossiness and a reduction in gloss unevenness) of the image and excellent ejection stability and storage stability of the liquid composition, which had been in the relationship of trade-off with respect to the methods in the related art, can be ensured at a high level, by effective functions of the individual configurations according to aspects of the present invention.

Liquid Composition

It can be provided that the liquid composition according to aspects of the present invention is achromatic, milk-white, or white in order that an image recorded with an ink containing a coloring material is not affected. Consequently, it can be provided that a ratio $A_{max}/A_{min}$ of the maximum absorbance $A_{max}$ to the minimum absorbance $A_{min}$ in a wavelength range of 400 nm to 780 nm, which is the wavelength range of the visible light, is 1.0 or more and 2.0 or less. This refers to the feature that a peak of absorbance is not observed substantially in the wavelength range of the visible light, or even when a peak is observed, the intensity of the peak is very small. Such a liquid composition according to aspects of the present invention can contain no coloring material. In examples according to aspects of the present invention described later, the above-described absorbance was measured with Hitachi double beam spectrophotometer U-2900 (produced by Hitachi High-Technologies Corporation) by using an undiluted liquid composition. In this regard, the absorbance may be measured after the liquid composition is diluted. This is because both values of the maximum absorbance $A_{max}$ and the minimum absorbance $A_{min}$ of the liquid composition are proportional to the dilution factor and the value of $A_{max}/A_{min}$ does not depend on the dilution factor. Each of components constituting the liquid composition according to aspects of the present invention will be described below.

ABC Triblock Polymer

In the present invention, the "ABC triblock polymer" refers to a polymer having a structure in which three different types of polymers, the A block, the B block, and the C block, are joined by covalent bonds in the order of A, B, and C. Each of the blocks may be a polymer produced by homopolymerizing a single type of monomer or a random polymer produced by random-copolymerizing at least two types of monomers insofar as the polymer is different from the other two blocks. However, the case where each block is a block polymer of at least two types of monomers, such as, the case where the A block is furthermore a binary block polymer, is not included in the "ABC triblock polymer" in aspects of the present invention. By the way, hereafter the terms "(meth)acrylic acid" and "(meth)acrylate" refer to "acrylic acid, methacrylic acid" and "acrylate, methacrylate", respectively.

Monomer Constituting A Block

As for the monomer constituting the A block through polymerization, an alpha, beta-ethylenic unsaturated compound having an aryl group is mentioned. In aspects of the present invention, the "aryl group" refers to a functional group or a substituent derived from an aromatic hydrocarbon, e.g., a phenyl group, a benzyl group, a tolyl group, an o-xylyl group, or a naphthyl group.

Examples of alpha, beta-ethylenic unsaturated compounds having an aryl group include aromatic vinyl compounds, e.g., styrene and alpha-methyl styrene; ester compounds synthesized from an alpha, beta-ethylenic unsaturated carboxylic acid and an alkyl alcohol having an aryl group, e.g., benzyl (meth)acrylate and 2-phenoxyethyl(meth)acrylate; amide compounds synthesized from an alpha, beta-ethylenic unsaturated carboxylic acid and an alkylamine having an aryl group, e.g., benzyl(meth)acrylamide and 2-phenoxyethyl (meth)acrylamide; 2-hydroxy-3-phenoxypropyl(meth)acrylate, and 2-(meth)acryloxyethylphthalic acid. In aspects of the present invention, the A block may be formed by homopolymerizing only one type of alpha, beta-ethylenic unsaturated compounds having an aryl group, or the A block may be formed by random-copolymerizing at least two types thereof. Among them, styrene and benzyl(meth)acrylate can be employed because the structure provides small steric hindrance and association occurs easily. The A block may be formed by random-copolymerizing the alpha, beta-ethylenic unsaturated compound having an aryl group and "other monomer" described later. At that case, the content (percent by mass) of the "other monomer" may be 35.0 percent by mass or less relative to the content (percent by mass) of the A block. As for the "other monomer" used for the A block, a monomer selected from (meth)acrylic acid ester compounds, (meth)acrylic acid alkylamide compounds, and nitrogen-containing vinyl compounds can be employed. In aspects of the present invention, in particular, the A block can be formed by polymerizing only an alpha, beta-ethylenic unsaturated compounds having an aryl group, that is, the content of the "other monomer" may be 0 percent by mass relative to the content (percent by mass) of the A block. Furthermore, the acid value of the A block can be made smaller than the acid values of the B block and the C block. Moreover, the acid values of the individual blocks can satisfy the relationship represented by (acid value of A block)<(acid value of B block)<(acid value of C block).

Monomer Constituting B Block

As for the monomer constituting the B block having a unit represented by the above-described general formula (1) through polymerization, a compound represented by the following general formula (3) is mentioned.

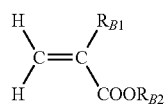

General formula (3)

In the general formula (3), $R_{B1}$ represents a hydrogen atom or a methyl group and $R_{B2}$ represents a straight-chain or branched alkyl group having the carbon number of 1 to 8, a cycloalkyl group having the carbon number of 4 to 8, or a hydroxy alkyl group having the carbon number of 2 to 8.

As for the compounds represented by the general formula (3), (meth)acrylic acid alkyl esters and (meth)acrylic acid hydroxyalkyl esters synthesized from (meth)acrylic acid and straight-chain or branched alkyl alcohols having the carbon number of 1 to 8 or cycloalkyl alcohols having the carbon number of 4 to 8 are mentioned. Specific examples include methyl(meth)acrylate, n-butyl(meth)acrylate, 2-ethylhexyl (meth)acrylate, cyclohexyl(meth)acrylate, 2-hydroxyethyl (meth)acrylate, and 3-methyl-5-hydroxypentyl(meth)acrylate. In aspects of the present invention, the B block may be formed by homopolymerizing only one type of compound represented by the above-described general formula (3), or the B block may be formed by random-copolymerizing at least two types thereof. The B block may be formed by random-copolymerizing the compound represented by the general formula (3) and "other monomer" described later. As for the "other monomer" used for the B block, (meth)acrylic acid ester compounds, (meth)acrylic acid alkylamide compounds, and nitrogen-containing vinyl compounds can be used. The content (percent by mass) of the "other monomer" may be 35.0 percent by mass or less relative to the content (percent by mass) of the B block.

Monomer Constituting C Block

As for the monomer constituting the C block having a unit represented by the above-described general formula (2) through polymerization, a compound represented by the general formula (4) is mentioned.

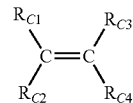

General formula (4)

In the general formula (4), at least one of $R_{C1}$ to $R_{C4}$ is a —COOH group, an —$R_{C5}$—COOH group, or a salt thereof, the remainder is a hydrogen atom, a straight-chain or branched alkyl group having the carbon number of 1 to 8, or a cycloalkyl group having the carbon number of 4 to 8, and $R_{C5}$ is a substituted or unsubstituted alkylene group having the carbon number of 1 to 5.

Examples of compounds represented by the general formula (4) include unsaturated carboxylic acids, e.g., (meth) acrylic acid, maleic acid, itaconic acid, and fumaric acid, derivatives thereof, and salts thereof. Examples of salts include alkali metal (lithium, sodium, potassium, and the like) salts, ammonium salts, and organic ammonium salts. Among them, (meth)acrylic acid can be employed. As for the salt, sodium salts or potassium salts can be employed. In aspects of the present invention, the C block may be formed by homopolymerizing only one type of compound represented by the above-described general formula (4) or the C block may be formed by random-copolymerizing at least two types. Alternatively, the C block may be formed by random-copolymerizing the compound represented by the general formula (4) and "other monomer" described later in such a way that desired properties are obtained. At this time, as for the "other monomer", monomers exhibiting hydrophobicity to a great extent (monomers having an aryl group and the like) may not be used favorably. The content (percent by mass) of the "other monomer" may be 35.0 percent by mass or less relative to the content (percent by mass) of the C block. In aspects of the present invention, the C block can be formed by polymerizing only the compound represented by the general formula (4), that is, the content of the "other monomer" may be 0 percent by mass relative to the content (percent by mass) of the C block.

According to aspects of the present invention, the proportion (percent by mass) of the C block in the ABC triblock polymer may be 2.0 percent by mass or more and 35.0 percent by mass or less relative to a total mass of the ABC triblock polymer, and even 2.0 percent by mass or more and 20.0 percent by mass or less. If the proportion is less than 2.0 percent by mass, the hydrophilicity of the polymer is reduced, and the hydrophobic interaction among the polymers is enhanced relatively, so that the polymers may form aggregates. Consequently, in some cases, effects of improving the storage stability and the ejection stability of the liquid composition are not obtained sufficiently. On the other hand, if the content is more than 35.0 percent by mass, the hydrophilicity is enhanced and hydrophobic segments are reduced relatively, so that the triblock polymers do not associate easily. Then, in application to the recording medium, the triblock polymer permeates into the recording medium easily, so that an effect of improving the gloss property of the image is not obtained sufficiently in some cases. The acid value of the C block can be made larger than the acid values of the A block and the B block.

Other Monomers

Each of A to C blocks of the ABC triblock polymer used for the liquid composition according to aspects of the present invention may be formed by random-copolymerizing the monomer to become a unit constituting each of the above-described blocks and the "other monomer" within the range in which the effects of the present invention are obtained. In that case, the content (percent by mass) of the "other monomer" may be 35.0 percent by mass or less relative to the content (percent by mass) of the block for which the "other monomer" is used.

Specific examples of the "other monomers" include (meth) acrylic acid; (meth)acrylic acid ester compounds, e.g., methoxyethyl(meth)acrylate, ethoxyethyl(meth)acrylate, diethylene glycol(meth)acrylate, triethylene glycol(meth)acrylate, tetraethylene glycol(meth)acrylate, polyethylene glycol (meth)acrylate, methoxydiethylene glycol(meth)acrylate, methoxytriethylene glycol(meth)acrylate, methoxytetraethylene glycol(meth)acrylate, methoxypolyethylene glycol (meth)acrylate, cyclohexyl(meth)acrylate, isobornyl(meth) acrylate, and N,N-dimethylaminopropyl(meth)acrylate; (meth)acrylic acid alkylamide compounds, e.g., (meth)acrylamide, dimethyl(meth)acrylamide, N,N-dimethylethyl (meth)acrylamide, N,N-dimethylpropyl(meth)acrylamide, isopropyl(meth)acrylamide, diethyl(meth)acrylamide, and (meth)acryloyl morpholine; and nitrogen-containing vinyl compounds, e.g., N-vinyl acetamide, N-vinyl formamide, N-vinyl pyridine, N-vinyl pyrrolidone, and N-vinyl carbazole.

Method for Synthesizing Triblock Polymer

Any synthesis method generally used in the related art may be used as the method for synthesizing the triblock polymer used for the liquid composition according to aspects of the present invention insofar as the triblock polymer has the above-described structure. Specific examples thereof include methods in the related art, e.g., a living radical polymerization method and a living anion polymerization method. As for a method for introducing a block structure derived from an acidic monomer into a molecular chain of the triblock polymer, a polymerization method by using an acidic monomer and a method in which polymerization is effected by using an alkyl ester monomer of an acidic monomer and, thereafter, the alkyl ester group is hydrolyzed are mentioned.

Method for Analyzing Triblock Polymer

The composition and the molecular weight of the triblock polymer can be analyzed by a method in the related art. Furthermore, it is also possible to ascertain on the basis of the liquid composition containing the triblock polymer by subjecting the liquid composition to centrifugal separation and examining the resulting sediments and a supernatant fluid. Although it is possible to ascertain individually in the state of liquid composition, higher accuracy is ensured through extraction of the triblock polymer. As for a specific method, the liquid composition is subjected to centrifugal separation at 75,000 rpm, and the triblock polymer is extracted from the resulting supernatant fluid. The separated triblock polymer is analyzed by using a high-temperature gas chromatography/mass spectrometer (high-temperature GC/MS) and, thereby, the types of units constituting the triblock polymer can be identified. The separated triblock polymer is analyzed quantitatively by using a nuclear magnetic resonance method ($^{13}$C-NMR) and a Fourier transform infrared spectrophotometer (FT-IR) and, thereby, the molecular weights, the types, and the contents of these compounds can be determined. The acid value of the triblock polymer can be measured by a titration method. In examples described later, the polymer is dissolved into tetrahydrofuran (THF) and the acid value can be measured through potentiometric titration by using Automatic Potentiometric Titrator AT510 (produced by Kyoto Electronics Manufacturing Co., Ltd.) with a potassium hydroxide ethanol titrant. The weight average molecular weight and the number average molecular weight of the triblock polymer are obtained by gel permeation chromatography (GPC). According to aspects of the present invention, the measurement condition of GPC is as described below.

Apparatus: Alliance GPC 2695 (produced by Waters)

Column: four gang column of Shodex KF-806M (produced by SHOWA DENKO K.K.)

Mobile phase: THF (analytical grade)

Flow rate: 1.0 mL/min

Oven temperature: 40.0° C.

Amount of injection of sample solution: 0.1 mL

Detector: RI (refractive index)

Polystyrene standard sample: PS-1 and PS-2 (produced by Polymer Laboratories) (molecular weight: 17 types of 7,500,000, 2,560,000, 841,700, 377,400, 320,000, 210,500, 148,000, 96,000, 59,500, 50,400, 28,500, 20,650, 10,850, 5,460, 2,930, 1,300, and 580)

In the examples described later, the measurement was performed under the above-described condition.

Characteristics of Triblock Polymer

Regarding the ABC triblock polymer used for the liquid composition according to aspects of the present invention, the number average molecular weight (Mn), in terms of polystyrene, obtained by GPC may be 1,000 or more and 30,000 or less, such as 1,000 or more and 10,000 or less, and even 2,000 or more and 10,000 or less. If the number average molecular weight is less than 1,000, the hydrophilicity of the triblock polymer is enhanced and in application to the recording medium, the triblock polymer permeates into the recording medium easily, so that an effect of improving the gloss property of the image is not obtained sufficiently in some cases. If the number average molecular weight is more than 30,000, the water solubility of the triblock polymer is reduced and, thereby, the hydrophobic interaction is enhanced, so that the ABC triblock polymers form aggregates. Consequently, in some cases, effects of improving the storage stability and the ejection stability of the liquid composition are not obtained sufficiently.

The molecular weight distribution obtained by GPC of the ABC triblock polymer may satisfy $1.0 \leq$ (weight average molecular weight: Mw)/(number average molecular weight: Mn)$\leq 2.0$. The value of the molecular weight distribution is 1.0 or more in theory. An approach of this value to 1.0 refers to an approach to monodispersion. Meanwhile, if the molecular weight distribution is more than 2.0, high-molecular weight and low-molecular weight ABC triblock polymers are present in a mixed state. Therefore, effects of improving the storage stability and the ejection stability of the liquid composition and an effect of improving the gloss property of the image are not obtained sufficiently in some cases. The content (percent by mass) of the ABC triblock polymer in the liquid composition may be 0.1 percent by mass or more and 15.0 percent by mass or less relative to a total mass of the liquid composition.

Aqueous Medium

The liquid composition according to aspects of the present invention contains an aqueous medium which is a mixed solvent of water and a water-soluble organic solvent. As for the water, ion-exchanged water (deionized water) can be used. Examples of water-soluble organic solvents include alkyl alcohols having the carbon number of 1 to 4, amides, polyalkylene glycols, glycols, alkylene glycols in which an alkylene group has the carbon number of 2 to 6, polyhydric alcohols, alkyl ethers of polyhydric alcohols, and nitrogen-containing compounds. These water-soluble organic solvents may be used alone or in combination. The content (percent by mass) of the water in the ink may be 10.0 percent by mass or more and 90.0 percent by mass or less, and even 30.0 percent by mass or more and 80.0 percent by mass or less relative to a total mass of the liquid composition. The content (percent by mass) of the water-soluble organic solvent in the liquid composition may be 3.0 percent by mass or more and 50.0 percent by mass or less, and even 3.0 percent by mass or more and 40.0 percent by mass or less relative to a total mass of the liquid composition.

Other Components

The liquid composition according to aspects of the present invention may optionally contain various additives, e.g., a surfactant, a pH regulator, a rust inhibitor, an antiseptic, a fungicide, an antioxidant, a reduction inhibitor, a vaporization promoter, a chelating agent, and polymers other than the above-described ABC triblock polymer, besides the above-described components. The content (percent by mass) of such additives in the liquid composition may be 0.05 percent by mass or more and 10.0 percent by mass or less, and even 0.2 percent by mass or more and 5.0 percent by mass or less relative to a total mass of the liquid composition. In this regard, the liquid composition according to aspects of the present invention can contain no additives (substances, such as, reacting agents described later) having functions of unstabilizing the association state of the above-described ABC triblock polymers and causing aggregation.

The pH of the liquid composition according to the present invention may be specified to be 7 or more and 10 or less, and the pH may be adjusted by using the pH regulator. The pH of the liquid composition is a value at 25° C. and may be measured by using a common pH meter.

Method for Preparing Liquid Composition

As for the method for preparing the liquid composition according to aspects of the present invention, a method in which raw materials are mixed and agitated is mentioned. At this time, heating may be performed. Alternatively, the liquid composition may be obtained by dissolving the ABC triblock polymer into an organic solvent, e.g., tetrahydrofuran, adding and mixing the above-described aqueous medium and other components, as necessary, and removing the organic solvent with a separating funnel, an evaporator, or the like.

Liquid Cartridge

The liquid cartridge according to aspects of the present invention includes a liquid storage portion to store a liquid composition, wherein the above-described liquid composition according to aspects of the present invention is stored in the above-described liquid storage portion. Furthermore, a form in which the liquid cartridge is configured to have the liquid storage portion and a recording head may be employed.

Ink

Each of components, which can be used together with the liquid composition according to aspects of the present invention and which constitute the ink, will be described below.

Pigment

Any inorganic pigment and organic pigment in the related art may be used for the coloring material, which is used together with the liquid composition according to aspects of the present invention, of the ink. Examples of pigments include polymer dispersion type pigments by using polymers as dispersing agents (a polymer-dispersing pigment by using a macromolecular dispersing agent, a microcapsule pigment in which the surfaces of pigment particles are covered with a polymer, and a polymer-attached self-dispersing pigment in which an organic group containing a high molecule is chemically attached to the surfaces of pigment particles) and self dispersion type pigments in which a hydrophilic group is attached to the surfaces of pigment particles (a self-dispersing pigment). As a matter of course, pigments prepared by different dispersing methods can be used in combination. As for the content of the pigment, 0.1 percent by mass or more and 20.0 percent by mass or less is suitable relative to a total mass of the ink, and 1.0 percent by mass or more and 12.0 percent by mass or less may be provided.

Aqueous Medium and Other Components

An aqueous medium which is water or a mixed solvent of water and a water-soluble organic solvent may be used for the ink. The content (percent by mass) of the water-soluble organic solvent in the ink may be 3.0 percent by mass or more and 50.0 percent by mass or less relative to a total mass of the ink. As for the water-soluble organic solvent, the same water-soluble organic solvents as those mentioned as water-soluble organic solvents usable for the liquid composition may be used. As for the water, deionized water (ion-exchanged water) can be used. The content (percent by mass) of the water in the ink may be 50.0 percent by mass or more and 95.0 percent by mass or less relative to a total mass of the ink. Furthermore, the same components as those mentioned as other components usable for the above-described liquid composition may be used for the ink. For example, the ABC triblock polymer used for the liquid composition may be contained in the ink.

Set of Liquid Composition and Ink

The liquid composition according to aspects of the present invention can be used as a set in combination with an ink containing a pigment. The ink which can be combined to form a set and which contains a pigment is not specifically limited, and a cyan ink, a magenta ink, a yellow ink, a black ink, and the like may be used. The set according to aspects of the present invention includes the case where a plurality of single liquid cartridges are used in combination besides, as a matter of course, a liquid cartridge, in which a plurality of liquid cartridges are integrated, in itself.

Reaction Liquid

Each of components, which may be used together with the liquid composition according to aspects of the present invention and which constitute a reaction liquid to aggregate the ABC triblock polymers, will be described below. Examples of methods for applying the reaction liquid include an ink jet method and a roller coating method.

Reacting Agent

The reaction liquid, which may be used together with the liquid composition according to aspects of the present invention, contains a reacting agent having functions of unstabilizing the association state of the ABC triblock polymers contained in the liquid composition and causing aggregation. Examples of such reacting agents include polyvalent metal ions, acidic compounds, and cationic compounds. The liquid composition according to aspects of the present invention can contain no such reacting agents.

As for the polyvalent metal ion, metal ions having at least divalence can be used. Examples of divalent metal ions include alkaline earth metals, e.g., beryllium, magnesium, calcium, strontium, barium, and radium. Examples of metal ions having at least trivalence include aluminum, yttrium, zirconium, iron, and other transition metal ions. In aspects of the present invention, the polyvalent metal ion may be added in the form of a hydroxide, a chloride, a nitrate, a sulfate, or the like to the reaction liquid. Among them, the form of nitrate can be employed.

Examples of acidic compounds include methanesulfonic acid, citric acid, ascorbic acid, succinic acid, malic acid, aspartic acid, glutamic acid, pyruvic acid, N-(2-acetamide)

iminodiacetic acid, bis(2-hydroxyethyl)iminotris(hydroxymethyl)methane, and 2-morphorinoethanesulfonic acid.

Examples of cationic compounds include polyallylamines, vinyl-pyrrolidone-N,N-dimethylaminoethyl methacrylic acid copolymer sulfate, ethyleneimine, epichlorohydrin-dimethylamine polymer, dimethyldiallylammonium chloride, dicyandiamide.diethylenetriamineammonium chloride, and guanidine formaldehyde.

Aqueous Medium and Other Components

An aqueous medium which is water or a mixed solvent of water and a water-soluble organic solvent may be used for the reaction liquid. The content (percent by mass) of the water-soluble organic solvent in the reaction liquid may be 5.0 percent by mass or more and 60.0 percent by mass or less relative to a total mass of the reaction liquid. As for the water-soluble organic solvent, the same water-soluble organic solvents as those mentioned as water-soluble organic solvents usable for the liquid composition may be used. As for the water, deionized water (ion-exchanged water) can be used. The content (percent by mass) of the water in the reaction liquid may be 40.0 percent by mass or more and 95.0 percent by mass or less relative to a total mass of the reaction liquid. Furthermore, the same components as those mentioned as other components usable for the above-described liquid composition may be used for the reaction liquid. The viscosity of the ink at 25° C. may be 1 cps or more and 30 cps or less.

The reaction liquid can be achromatic, milk-white, or white in order that an image recorded with an ink is not affected. That is, the ratio $A_{max}/A_{min}$ of the maximum absorbance $A_{max}$ to the minimum absorbance $A_{min}$ in a wavelength range of 400 nm to 780 nm may be 1.0 or more and 2.0 or less. Furthermore, the reaction liquid can form a colorless transparent film in application to the recording medium. Such a reaction liquid can contain no coloring material.

Set of Liquid Composition, Ink, and Reaction Liquid

The liquid composition according to aspects of the present invention can be used as a set in combination with the reaction liquid to aggregate the ABC triblock polymer and the ink containing a pigment. This is because the ABC triblock polymer may be unstabilized and aggregated, so that a film of the ABC triblock polymer is strengthened and the scratch resistance is improved. Furthermore, when the liquid composition is applied to the recording medium, the ABC triblock polymer is unstabilized and aggregated, it becomes more difficult to permeate into the recording medium, so that the glossiness of the image is further improved.

Ink Jet Recording Method

An ink jet recording method according to aspects of the present invention is the ink jet recording method including an ink ejecting step to eject an ink containing a pigment by an ink jet method and a liquid composition ejecting step to eject a liquid composition by the ink jet method. According to aspects of the present invention, in particular, an ink jet recording method employing the system in which thermal energy is applied to the liquid composition and the ink so as to eject the ink from the ejection orifice of the recording head can be used. In aspects of the present invention, the term "recording" includes a form in which recording is performed on a recording medium, e.g., glossy paper or normal paper, by using the liquid composition according to aspects of the present invention and a form in which printing is performed on a non-permeable recording medium, e.g., glass, plastic, and film, by using the liquid composition according to aspects of the present invention.

The ink jet recording method according to aspects of the present invention includes two steps, the liquid composition ejecting step (A) and the ink ejecting step (B). The step (A) may be performed prior to the step (B), or the step (A) may be performed after the step (B). However, the step (A) can be performed after the step (B) because an effect of improving the gloss property of the image is exerted significantly.

The ink jet recording method according to aspects of the present invention may further include a step of applying the reaction liquid to aggregate the ABC triblock polymer. At this time, the order of performance of the liquid composition ejecting step (A) and the reaction liquid applying step (C) does not matter. However, the step (A) can be performed after the step (C) from the viewpoint of image density and an improvement in fixability. This is because in the case where the liquid composition is applied to the recording medium provided with the reaction liquid, unstabilization of the ABC triblock polymer contained in the liquid composition occurs instantaneously and, thereby, the polymers are aggregated, so that permeation into the recording medium is further suppressed.

EXAMPLES

Aspects of the present invention will be described below in further detail with reference to examples and comparative examples. However, the present invention is not limited to the following examples within the bounds of not departing from the gist thereof. By the way, in the following description of the examples, the term "part" is on a mass basis, unless otherwise specified. Abbreviations are as described below.

AA: acrylic acid
MAA: methacrylic acid
MMA: methyl methacrylate
nBA: n-butyl acrylate
nBMA: n-butyl methacrylate
tBMA: tert-butyl methacrylate
HEMA: 2-hydroxyethyl methacrylate
HEA: 2-hydroxyethyl acrylate
St: styrene
BzMA: 2-benzyl methacrylate
PEMA: 2-phenylethyl methacrylate
SMA: stearyl methacrylate
MTEGMA: methoxytriethylene glycol methacrylate
ETEGMA: ethoxytriethylene glycol methacrylate
Preparation of Polymer Aqueous Solution
Preparation of Polymer Aqueous Solutions 1 to 38 and 43 to 48

Each polymer aqueous solution was prepared by using the following Polymerization method I or Polymerization method II with charges described in Table 1.

Polymerization Method I

In a nitrogen atmosphere at a polymerization temperature T (° C.), a n-butyl lithium (n-BuLi) solution was added to 160 g of tetrahydrofuran (THF) including 0.47 g of lithium. Subsequently, Monomer x was added and agitation was performed for 40 minutes. Thereafter, 3.08 g of diethyl zinc solution was added and agitation was performed for 1 minute to obtain a polymerization solution of Monomer x. Monomer y solution prepared by adding Monomer y to 11 g of THF and adding 4.53 g of diethyl zinc solution in four batches was dropped on the polymerization solution of Monomer x over 6 minutes. After dropping was finished, agitation was performed for 60 minutes to obtain an XY diblock polymer aqueous solution. Furthermore, Monomer z solution prepared by adding Monomer z to 11 g of THF and adding 4.53 g of diethyl zinc solution in four batches was dropped on the XY diblock polymer aqueous solution over 6 minutes. After dropping was finished, agitation was performed for 60 minutes, and 1.3 g of acetic acid was added to terminate the reaction. An XYZ triblock polymer was obtained by adding 2.8 g of 35.0% hydrochloric acid aqueous solution to the resulting solution, performing agitation at room temperature for 10 minutes, and performing washing three times with pure water, followed by drying.

The number average molecular weight of the resulting XYZ triblock polymer was measured with GPC provided with a differential refractometer (produced by Tosoh Corporation) by using polystyrene as a standard substance and THF as a solvent. In the case where tBMA was used as a monomer, it was ascertained that tBMA was hydrolyzed because a peak was present at a chemical shift value δ: 12 to 13 of a carboxyl group of MAA on the basis of proton nuclear magnetic resonance ($^1$H-NMR) spectroscopy. In addition, constituent ratios of monomers constituting each block were analyzed on the basis of the $^1$H-NMR measurement. As for the acid value, the XYZ triblock polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant. The resulting XYZ triblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass polymer aqueous solution.

Polymerization Method II

In a glove box subjected to nitrogen substitution, Monomer x and (1-methyltellanyl-ethyl)benzene (MTEBz) were reacted at a polymerization temperature T (° C.) for 30 hours. After the reaction was finished, Monomer y was added successively, and a reaction was effected at a polymerization temperature T (° C.) for 30 hours. After the reaction was finished, Monomer z was added, and a reaction was effected at a polymerization temperature T (° C.) for 30 hours. After the reaction was finished, the reaction solution was dissolved into 5 mL of chloroform, and the resulting solution was poured into agitated 300 mL of water/methanol mixed solution (water:methanol=1:4). A precipitated polymer was suction-filtrated and dried, so as to obtain an XYZ triblock polymer.

The molecular weight of the resulting XYZ triblock polymer was measured with GPC provided with a differential refractometer (produced by Tosoh Corporation) by using polystyrene as a standard substance and THF as a solvent. In addition, constituent ratios of monomers constituting each block were analyzed on the basis of the $^1$H-NMR spectroscopy. As for the acid value, the XYZ triblock polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant. A potassium hydroxide aqueous solution was added to the resulting XYZ triblock polymer solution in such a way that the degree of neutralization of anionic groups of the polymer became 80% on a mole basis, an appropriate amount of water was further added, and agitation was performed. Thereafter, polymerization solvent was removed under the condition of reduced pressure, and water was added, so as to obtain 25.0 percent by mass polymer aqueous solution.

TABLE 1

Preparation condition of polymer aqueous solution

| Polymer aqueous solution No. | Polymerization method | Polymerization temperature T (° C.) | nBuLi (g) | MTEBz (mg) | Monomer x Type | Monomer x Usage (g) | Monomer x Usage (part) | Monomer y Type | Monomer y Usage (g) | Monomer y Usage (part) | Monomer z Type | Monomer z Usage (g) | Monomer z Usage (part) |
|---|---|---|---|---|---|---|---|---|---|---|---|---|---|
| 1 | I | −50 | 3.080 | — | BzMA | 6.700 | 67.0 | HEMA | 2.300 | 23.0 | tBMA | 1.000 | 10.0 |
| 2 | I | −60 | 3.530 | — | BzMA | 0.700 | 67.4 | MMA | 0.239 | 23.0 | tBMA | 0.100 | 9.6 |
| 3 |   | −60 | 3.460 | — | BzMA | 0.700 | 67.4 | MMA | 0.239 | 23.0 | tBMA | 0.100 | 9.6 |
| 4 |   |   | 2.470 | — | BzMA | 0.700 | 67.4 | MMA | 0.239 | 23.0 | tBMA | 0.100 | 9.6 |
| 5 |   | −60 | 1.730 | — | BzMA | 0.700 | 67.4 | MMA | 0.239 | 23.0 | tBMA | 0.100 | 9.6 |
| 6 |   | −60 | 0.870 | — | BzMA | 0.700 | 67.4 | MMA | 0.239 | 23.0 | tBMA | 0.100 | 9.6 |
| 7 |   | −60 | 0.860 | — | BzMA | 0.700 | 67.4 | MMA | 0.239 | 23.0 | tBMA | 0.100 | 9.6 |
| 8 | II | 100 | — | 50.0 | St | 0.214 | 15.4 | HEA | 0.743 | 53.3 | AA | 0.436 | 31.3 |
| 9 |   | 100 | — | 50.0 | St | 0.218 | 15.7 | HEA | 0.738 | 53.0 | AA | 0.436 | 31.3 |
| 10 |   | 100 | — | 50.0 | St | 0.306 | 22.0 | HEA | 0.651 | 46.7 | AA | 0.436 | 31.3 |
| 11 |   | 100 | — | 50.0 | St | 0.436 | 31.3 | HEA | 0.520 | 37.4 | AA | 0.436 | 31.3 |
| 12 |   | 100 | — | 50.0 | St | 0.658 | 47.3 | HEA | 0.298 | 21.4 | AA | 0.436 | 31.3 |
| 13 |   | 100 | — | 50.0 | St | 0.670 | 47.8 | HEA | 0.296 | 21.1 | AA | 0.436 | 31.1 |
| 14 | I | −60 | 1.780 | — | BzMA | 0.700 | 66.7 | HEMA | 0.223 | 21.3 | tBMA | 0.126 | 12.0 |
| 15 |   | −50 | 1.780 | — | BzMA | 0.700 | 66.7 | HEMA | 0.223 | 21.3 | tBMA | 0.126 | 12.0 |
| 16 |   | −35 | 1.780 | — | BzMA | 0.700 | 66.7 | HEMA | 0.223 | 21.3 | tBMA | 0.126 | 12.0 |
| 17 |   | −20 | 1.780 | — | BzMA | 0.700 | 66.7 | HEMA | 0.223 | 21.3 | tBMA | 0.126 | 12.0 |
| 18 |   | 0 | 1.780 | — | BzMA | 0.700 | 66.7 | HEMA | 0.223 | 21.3 | tBMA | 0.126 | 12.0 |
| 19 |   | 10 | 1.780 | — | BzMA | 0.700 | 66.7 | HEMA | 0.223 | 21.3 | tBMA | 0.126 | 12.0 |
| 20 | I | −50 | 7.000 | — | BzMA | 0.700 | 68.6 | HEMA | 0.270 | 26.4 | tBMA | 0.051 | 5.0 |
| 21 |   | −50 | 6.900 | — | BzMA | 0.700 | 68.6 | HEMA | 0.270 | 26.4 | tBMA | 0.051 | 5.0 |
| 22 |   | −50 | 1.730 | — | BzMA | 0.700 | 64.8 | HEMA | 0.180 | 16.7 | tBMA | 0.200 | 18.5 |
| 23 |   | −50 | 0.690 | — | BzMA | 0.700 | 62.5 | HEMA | 0.120 | 10.7 | tBMA | 0.300 | 26.8 |
| 24 |   | −50 | 0.231 | — | BzMA | 0.700 | 60.9 | HEMA | 0.070 | 6.1 | tBMA | 0.380 | 33.0 |
| 25 |   | −50 | 0.230 | — | BzMA | 0.700 | 60.9 | HEMA | 0.070 | 6.1 | tBMA | 0.380 | 33.0 |
| 26 | I | −50 | 1.730 | — | BzMA | 0.190 | 18.6 | HEMA | 0.070 | 75.3 | tBMA | 0.063 | 6.2 |
| 27 |   | −50 | 1.730 | — | BzMA | 0.200 | 19.6 | HEMA | 0.760 | 74.3 | tBMA | 0.063 | 6.2 |
| 28 |   | −50 | 1.730 | — | BzMA | 0.400 | 38.2 | HEMA | 0.520 | 49.7 | tBMA | 0.127 | 12.1 |
| 29 |   | −50 | 1.730 | — | BzMA | 0.600 | 56.2 | HEMA | 0.290 | 27.2 | tBMA | 0.177 | 16.6 |

TABLE 1-continued

Preparation condition of polymer aqueous solution

| Polymer aqueous solution No. | Polymerization method | Polymerization temperature T (° C.) | nBuLi (g) | MTEBz (mg) | Monomer x Type | Usage (g) | (part) | Monomer y Type | Usage (g) | (part) | Monomer z Type | Usage (g) | (part) |
|---|---|---|---|---|---|---|---|---|---|---|---|---|---|
| 30 |  | −50 | 1.730 | — | BzMA | 0.800 | 74.8 | HEMA | 0.093 | 8.7 | tBMA | 0.177 | 16.5 |
| 31 |  | −50 | 1.730 | — | BzMA | 0.810 | 75.7 | HEMA | 0.083 | 7.8 | tBMA | 0.177 | 16.5 |
| 32 | II | 100 | — | 80.0 | St | 0.300 | 30.0 | HEMA | 0.671 | 67.1 | MAA | 0.029 | 2.9 |
| 33 |  | 100 | — | 80.0 | St | 0.300 | 30.0 | HEMA | 0.669 | 66.9 | MAA | 0.031 | 3.1 |
| 34 |  | 100 | — | 80.0 | St | 0.350 | 35.0 | HEMA | 0.589 | 58.9 | MAA | 0.061 | 6.1 |
| 35 |  | 100 | — | 40.0 | St | 0.700 | 70.0 | HEMA | 0.162 | 16.2 | MAA | 0.138 | 13.8 |
| 36 |  | 100 | — | 35.0 | St | 0.700 | 70.0 | HEMA | 0.072 | 7.2 | MAA | 0.228 | 22.8 |
| 37 |  | 100 | — | 25.0 | St | 0.650 | 65.0 | HEMA | 0.120 | 12.0 | MAA | 0.230 | 23.0 |
| 38 |  | 100 | — | 25.0 | St | 0.650 | 65.0 | HEMA | 0.119 | 11.9 | MAA | 0.231 | 23.1 |
| 43 | I | −50 | 1.730 | — | HEMA | 0.238 | 22.9 | BzMA | 0.700 | 67.3 | tBMA | 0.102 | 9.8 |
| 44 |  | −50 | 1.730 |  | BzMA | 0.700 | 67.3 | tBMA | 0.102 | 9.8 | HEMA | 0.238 | 22.9 |
| 45 |  | −50 | 1.730 |  | SMA | 0.200 | 20.0 | nBMA | 0.400 | 40.0 | MTEGMA | 0.400 | 40.0 |
| 46 |  | −50 | 1.730 |  | BzMA | 0.700 | 67.3 | MTEGMA | 0.238 | 22.9 | tBMA | 0.102 | 9.8 |
| 47 |  | −50 | 1.730 |  | MTEGMA | 0.700 | 67.3 | HEMA | 0.238 | 22.9 | tBMA | 0.102 | 9.8 |
| 48 |  | −50 | 1.730 |  | BzMA | 0.700 | 70.0 | HEMA | 0.238 | 23.8 | MTEGMA | 0.062 | 6.2 |

Preparation of Polymer Aqueous Solution 39

In a nitrogen atmosphere at −50° C., 1.73 g of n-BuLi solution was added to 160 g of THF including 0.47 g of lithium. Subsequently, 0.70 g of BzMA, 0.24 g of HEMA, and 0.10 g of tBMA were added and agitation was performed for 40 minutes. Thereafter, 3.08 g of diethyl zinc solution was added and agitation was performed for 1 minute. Furthermore, 1.3 g of acetic acid was added to terminate the reaction. A random polymer was obtained by adding 2.8 g of 35.0% hydrochloric acid aqueous solution to the resulting solution, performing agitation at room temperature for 10 minutes, and performing washing three times with pure water, followed by drying.

The molecular weight of the resulting random polymer was measured with GPC provided with a differential refractometer (produced by Tosoh Corporation) by using polystyrene as a standard substance and THF as a solvent. It was ascertained that tBMA was hydrolyzed because a peak was present at a chemical shift value δ: 12 to 13 of a carboxyl group of MAA on the basis of the proton nuclear magnetic resonance ($^1$H-NMR) spectroscopy. In addition, constituent ratios of monomers were analyzed on the basis of the $^1$H-NMR measurement. As for the acid value, the random polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant. The resulting random polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solution 39.

Preparation of Polymer Aqueous Solutions 40 to 42

Polymer aqueous solutions 40 to 42 were prepared by using the following polymerization method with charges described in Table 2. In a nitrogen atmosphere at −50° C., 1.73 g of n-BuLi solution was added to 160 g of THF including 0.47 g of lithium. Subsequently, Monomer x was added and agitation was performed for 40 minutes. Thereafter, 3.08 g of diethyl zinc solution was added and agitation was performed for 1 minute to obtain a polymerization solution of Monomer x. Monomer y solution prepared by adding Monomer y to 11 g of THF and adding 4.53 g of diethyl zinc solution in four batches was dropped on the polymerization solution of Monomer x over 6 minutes. After dropping was finished, agitation was performed for 60 minutes and, furthermore, 1.3 g of acetic acid was added to terminate the reaction. An XY diblock polymer was obtained by adding 2.8 g of 35.0% hydrochloric acid aqueous solution to the resulting solution, performing agitation at room temperature for 10 minutes, and performing washing three times with pure water, followed by drying.

The molecular weight of the resulting XY diblock polymer was measured with GPC provided with a differential refractometer (produced by Tosoh Corporation) by using polystyrene as a standard substance and THF as a solvent. It was ascertained that tBMA was hydrolyzed because a peak was present at a chemical shift value δ: 12 to 13 of a carboxyl group of MAA on the basis of the proton nuclear magnetic resonance ($^1$H-NMR) spectroscopy. In addition, constituent ratios of monomers constituting each block were analyzed on the basis of the $^1$H-NMR measurement. As for the acid value, the XY diblock polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant. The resulting XY diblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solutions 40 to 42.

TABLE 2

Preparation condition of polymer aqueous solution

| Polymer aqueous solution No. | Monomer x | | | | | | Monomer y | | | | | |
|---|---|---|---|---|---|---|---|---|---|---|---|---|
| | | Usage | | | Usage | | | Usage | | | Usage | |
| | Type | (g) | (part) | Type | (g) | (part) | Type | (g) | (part) | Type | (g) | (part) |
| 40 | BzMA | 0.799 | 70.6 | — | 0 | 0 | tBMA | 0.332 | 29.4 | — | 0 | 0 |
| 41 | BzMA | 0.700 | 67.3 | — | 0 | 0 | HEMA | 0.238 | 22.9 | tBMA | 0.102 | 9.8 |
| 42 | BzMA | 0.700 | 67.3 | HEMA | 0.238 | 22.9 | tBMA | 0.102 | 9.8 | — | 0 | 0 |

Preparation of Polymer Aqueous Solution 49

Polymer aqueous solution 49 was prepared referring to the synthesis method of Production 2 described in Example of Japanese Patent Laid-Open No. 7-53841. Dropping of 268 g (304 mL, 1.69 mol) of trimethylsilyl methacrylate on a solution of 22.6 g (26.2 mL, 130 mmol) of 1-methoxy-1-trimethylsiloxy-2-methyl-1-propene and 0.1 mL of tetrabutylammonium biacetate (0.1 mol/L in propylene carbonate) in 300 mL of THF was performed. During dropping, the temperature of the solution increased gradually, and 1.5 mL of tetrabutylammonium biacetate (0.1 mol/L in propylene carbonate) was added. After all monomers were added, the temperature was cooled to 30° C. Addition of 248 g (245 mL, 1.3 mol) of PEMA purified by being passed through a basic alumina column in an argon atmosphere was performed. Furthermore, 0.6 mL of tetrabutylammonium biacetate (0.1 mol/L in propylene carbonate) was added. After addition was finished, the temperature was cooled to 30° C., and 0.15 mL of tetrabutylammonium biacetate (0.1 mol/L in propylene carbonate) was added. Subsequently, 128 g (128 mL, 0.52 mol) of ETEGMA purified by being passed through a basic alumina column in argon atmosphere was dropped by using a dropping funnel, and 0.15 mL of tetrabutylammonium biacetate (0.1 mol/L in propylene carbonate) was added. It was ascertained on the basis of $^1$H-NMR spectroscopy that no remaining monomer was present. The resulting solution was refluxed together with 350 mL of 0.03 mol/L methanolic tetrabutylammonium fluoride and methanol for 16 hours. Distillation under reduced pressure was performed with a rotary evaporator to remove the solvent. A remaining polymer was dried in a vacuum oven at 50° C. for 48 hours, so that 515 g of MAA-PEMA-ETEGMA triblock polymer was obtained. The resulting triblock polymer was measured by the $^1$H-NMR spectroscopy and it was ascertained that no trimethylsilyl ester group remained. The resulting ABC triblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solution 49.

Preparation of Polymer Aqueous Solution 50

Polymer aqueous solution 50 was prepared referring to the synthesis method of Production 4 described in Example of Japanese Patent Laid-Open No. 7-53841. Dropping of 107 g (121 mL, 0.677 mol) of trimethylsilyl methacrylate on a solution of 9.05 g (10.5 mL, 51.9 mmol) of 1-methoxy-1-trimethylsiloxy-2-methyl-1-propene and 2 mL of tetrabutylammonium biacetate (0.1 mol/L in propylene carbonate) in 150 mL of THF was performed. During dropping, the temperature of the solution increased gradually, and 2 mL of tetrabutylammonium biacetate (0.1 mol/L in propylene carbonate) was added. After all monomers were added, the temperature continued increasing to 57° C. When the temperature was lowered to 33° C., 91.6 g (88.6 mL, 0.52 mol) of BzMA purified by being passed through a basic alumina column in an argon atmosphere was added. When equilibrium was reached at a temperature of 39° C., additional 1 mL of tetrabutylammonium biacetate (0.1 mol/L in propylene carbonate) was added. After addition of monomer was finished, the temperature increased to 57° C. When the temperature was lowered to 35° C., 51.2 g (51.2 mL, 0.205 mol) of ETEGMA purified by being passed through a basic alumina column in an argon atmosphere was dropped by using a dropping funnel, and the resulting mixture was agitated for one night. It was ascertained on the basis of $^1$H-NMR spectroscopy that no remaining monomer was present. The resulting solution was refluxed together with 150 mL of 0.03 mol/L methanolic tetrabutylammonium fluoride and 100 mL of THF for 12 hours. Distillation under reduced pressure was performed with a rotary evaporator to remove the solvent, and a remaining polymer was dried in a vacuum oven at 50° C. for 48 hours, so that 186.3 g of MAA-BzMA-ETEGMA triblock polymer was obtained. The resulting triblock polymer was measured by the $^1$H-NMR spectroscopy and it was ascertained that no trimethylsilyl ester group remained. The resulting ABC triblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solution 50.

Preparation of Polymer Aqueous Solution 51

Polymer aqueous solution 51 was prepared referring to the method for synthesizing a block copolymer BPI described in Example of Japanese Patent Laid-Open No. 2006-97016. The inside of a glass container provided with a three-way stopcock was substituted with nitrogen, and adsorbed water was removed by heating to 250° C. in a nitrogen gas atmosphere. After the system was returned to room temperature, isobutyl vinyl ether ($CH_2$=$CHOCH_2CH(CH_3)_2$) (hereafter abbreviated as IBVE) was added to 16 mmol of ethyl acetate, 0.05 mmol of 1-isobutoxyethyl acetate, and 11 mL of toluene, and the reaction system was cooled. When the temperature in the system reached 0° C., 0.2 mmol of ethylaluminum sesquichloride (an equimolar mixture of diethylaluminum chloride and ethylaluminum dichloride) was added and polymerization was effected. The molecular weight was subjected to time-division monitoring by using GPC and, thereby, completion of polymerization of isobutyl vinyl ether was ascertained. Subsequently, 2-(2-methoxyethoxy)-ethyl-vinyl ether ($CH_2$=$CHOCH_2CH_2OCH_2CH_2OCH_3$) (hereafter abbreviated as MEEVE) was added and polymerization was continued. Completion of polymerization of 2-(2-methoxyethoxy)-ethyl-vinyl ether was ascertained through monitoring by using GPC. Thereafter, a toluene solution of a monomer to form a unit structure, in which a carboxylic acid portion in benzoic acid 2-vinyloxyethyl ether ($CH_2$=$CHOCH_2CH_2OPhCOOH$: Ph represents a phenyl group) (hereafter abbreviated as BzAVEE) was esterified, was added, and a polymerization reaction was effected for 20 hours. The polymerization reaction was terminated by adding a 0.3 percent by mass ammonia/methanol aqueous solution into the system. The reaction mixture solution was diluted with dichloromethane and was washed three times with 0.6 mol/L hydrochloric acid aqueous solution and three times with distilled water. The resulting organic phase was concentrated and exsiccated with an evaporator and was vacuum-dried. Dialysis in a methanol solvent by using a cellulose semipermeable membrane was repeated to remove monomeric compounds. Neutralization with 0.1 mol/L hydrochloric acid aqueous solution was performed in an aqueous dispersion, so as to obtain a triblock polymer in which a sodium salt portion in the C block was converted to free carboxylic acid. The compound was identified by using $^1$H-NMR and GPC. The resulting ABC triblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solution 51.

Preparation of Polymer Aqueous Solution 52

Polymer aqueous solution 52 was prepared referring to the method for synthesizing Polymer 1 described in Example of Japanese Patent Laid-Open No. 2010-137471. The inside of a glass container provided with a three-way stopcock was substituted with nitrogen, and adsorbed water was removed by heating to 250° C. in a nitrogen gas atmosphere. After the system was returned to room temperature, 50 mmol of 4-methylbenzeneoxyethyl vinyl ether (MBOEVE), 160 mmol of ethyl acetate, 0.5 mmol of 1-isobutoxyethyl acetate, and 110 mL of toluene were added, and the reaction system was cooled. When the temperature in the system reached 0° C., 2.0 mmol of ethylaluminum sesquichloride (an equimolar mixture of diethylaluminum chloride and ethylaluminum dichloride) was added and polymerization was effected. The molecular weight was subjected to time-division monitoring by using GPC and, thereby, completion of polymerization of A block was ascertained. At this stage, Mn was 15,500 and Mw/Mn was 1.14. Subsequently, 50 mmol of methoxyethoxyethyl vinyl ether (MEEVE) serving as a monomer for the B block was added and polymerization was continued. Completion of polymerization of the B block was ascertained through monitoring by using GPC (at this stage, Mn was 28,600 and Mw/Mn was 1.15). Thereafter, 10 mmol of ethyl 4-{(vinyloxy)ethoxy}benzoate serving as a monomer for the C block was added and polymerization was continued. Completion of polymerization of the C block was ascertained through monitoring by using GPC, and the polymerization was terminated. The polymerization reaction was terminated by adding a 0.3 percent by mass ammonia/methanol aqueous solution into the system. The reaction mixture solution was diluted with dichloromethane and was washed three times with 0.6 M hydrochloric acid and three times with distilled water. The resulting organic phase was concentrated and exsiccated with an evaporator and was vacuum-dried. Then, a target triblock polymer was isolated therefrom. Furthermore, the resulting block polymer was agitated together with 5 N sodium hydroxide aqueous solution for 40 hours at room temperature (23° C.) so as to hydrolyze the ester of the C block. After neutralization with 5 N hydrochloric acid, extraction with methylene chloride, and drying were performed, the solvent was removed through distillation, so that an ABC triblock polymer in which the C block was 4-{(vinyloxy)ethoxy}benzoic acid (VOEBA) was obtained. The compound was identified by using $^1$H-NMR and GPC. The resulting ABC triblock polymer was dissolved into THF, a potassium hydroxide aqueous solution was added in such a way that the degree of neutralization of anionic groups of the polymer became 80% on a mole basis, an appropriate amount of water was further added, and agitation was performed. Thereafter, THF was removed under the condition of reduced pressure, and water was added, so as to obtain 25.0 percent by mass Polymer aqueous solution 52.

The polymer compositions and the properties of Polymer aqueous solutions 1 to 52 obtained as described above are shown in Table 3 to Table 5.

TABLE 3

Polymer composition and properties of polymer aqueous solution

| Polymer aqueous solution No. | X block Type | X block Composition ratio (percent by mass) | X block Type | X block Composition ratio (percent by mass) | Z block Type | Z block Composition ratio (percent by mass) | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|---|---|---|---|---|---|
| 1 | BzMA | 70.0 | HEMA | 23.9 | MAA | 6.1 | 40 | 70.0 | 4000 | 1.2 | 11.5 | 100 |
| 2 | BzMA | 70.0 | MMA | 23.9 | MAA | 6.1 | 40 | 70.0 | 1960 | 1.2 | 11.5 | 49 |
| 3 | BzMA | 70.0 | MMA | 23.9 | MAA | 6.1 | 40 | 70.0 | 2000 | 1.2 | 11.5 | 50 |
| 4 | BzMA | 70.0 | MMA | 23.9 | MAA | 6.1 | 40 | 70.0 | 2800 | 1.2 | 11.5 | 70 |
| 5 | BzMA | 70.0 | MMA | 23.9 | MAA | 6.1 | 40 | 70.0 | 4000 | 1.2 | 11.5 | 100 |
| 6 | BzMA | 70.0 | MMA | 23.9 | MAA | 6.1 | 40 | 70.0 | 8000 | 1.2 | 11.5 | 200 |
| 7 | BzMA | 70.0 | MMA | 23.9 | MAA | 6.1 | 40 | 70.0 | 8040 | 1.2 | 11.5 | 201 |
| 8 | St | 21.4 | HEA | 74.3 | AA | 4.4 | 34 | 21.4 | 6000 | 1.2 | 4.9 | 176 |
| 9 | St | 21.8 | HEA | 73.8 | AA | 4.4 | 34 | 21.8 | 6000 | 1.2 | 5.0 | 176 |
| 10 | St | 30.5 | HEA | 65.1 | AA | 4.4 | 34 | 30.5 | 6000 | 1.2 | 6.9 | 176 |
| 11 | St | 43.6 | HEA | 52.0 | AA | 4.4 | 34 | 43.6 | 6000 | 1.2 | 9.9 | 176 |
| 12 | St | 65.8 | HEA | 29.8 | AA | 4.4 | 34 | 65.8 | 6000 | 1.2 | 15.0 | 176 |
| 13 | St | 67.0 | HEA | 29.6 | AA | 4.4 | 34 | 67.0 | 6000 | 1.2 | 15.2 | 176 |
| 14 | BzMA | 70.0 | HEMA | 22.3 | MAA | 7.7 | 50 | 70.0 | 4000 | 1.1 | 9.1 | 80 |
| 15 | BzMA | 70.0 | HEMA | 22.3 | MAA | 7.7 | 50 | 70.0 | 4000 | 1.2 | 9.1 | 80 |
| 16 | BzMA | 70.0 | HEMA | 22.3 | MAA | 7.7 | 50 | 70.0 | 4000 | 1.4 | 9.1 | 80 |
| 17 | BzMA | 70.0 | HEMA | 22.3 | MAA | 7.7 | 50 | 70.0 | 4000 | 1.7 | 9.1 | 80 |

TABLE 3-continued

Polymer composition and properties of polymer aqueous solution

| Polymer aqueous solution No. | X block Type | X block Composition ratio (percent by mass) | X block Type | Composition ratio (percent by mass) | Z block Type | Composition ratio (percent by mass) | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|---|---|---|---|---|---|
| 18 | BzMA | 70.0 | HEMA | 22.3 | MAA | 7.7 | 50 | 70.0 | 4000 | 2.0 | 9.1 | 80 |
| 19 | BzMA | 70.0 | HEMA | 22.3 | MAA | 7.7 | 50 | 70.0 | 4000 | 2.1 | 9.1 | 80 |
| 20 | BzMA | 70.0 | HEMA | 26.9 | MAA | 3.1 | 20 | 70.0 | 990 | 1.2 | 22.6 | 50 |
| 21 | BzMA | 70.0 | HEMA | 29.9 | MAA | 3.1 | 20 | 70.0 | 1000 | 1.2 | 22.6 | 50 |
| 22 | BzMA | 70.0 | HEMA | 17.7 | MAA | 12.3 | 80 | 70.0 | 4000 | 1.2 | 5.7 | 50 |
| 23 | BzMA | 70.0 | HEMA | 11.6 | MAA | 18.4 | 120 | 70.0 | 10000 | 1.2 | 3.8 | 83 |
| 24 | BzMA | 70.0 | HEMA | 7.0 | MAA | 23.0 | 150 | 70.0 | 30000 | 1.2 | 3.0 | 200 |
| 25 | BzMA | 70.0 | HEMA | 7.0 | MAA | 23.0 | 150 | 70.0 | 30100 | 1.2 | 3.0 | 201 |
| 26 | BzMA | 19.0 | HEMA | 77.2 | MAA | 3.8 | 25 | 19.0 | 4000 | 1.2 | 5.0 | 160 |
| 27 | BzMA | 20.0 | HEMA | 76.2 | MAA | 3.8 | 25 | 20.0 | 4000 | 1.2 | 5.3 | 160 |
| 28 | BzMA | 40.0 | HEMA | 52.3 | MAA | 7.7 | 50 | 40.0 | 4000 | 1.2 | 5.2 | 80 |
| 29 | BzMA | 60.0 | HEMA | 29.3 | MAA | 10.7 | 70 | 60.0 | 4000 | 1.2 | 5.6 | 57 |
| 30 | BzMA | 80.0 | HEMA | 9.3 | MAA | 10.7 | 70 | 80.0 | 4000 | 1.2 | 7.5 | 57 |
| 31 | BzMA | 81.0 | HEMA | 8.3 | MAA | 10.7 | 70 | 81.0 | 4000 | 1.2 | 7.6 | 57 |
| 32 | St | 30.0 | HEMA | 67.1 | MAA | 2.9 | 19 | 30.0 | 3500 | 1.2 | 10.3 | 184 |
| 33 | St | 30.0 | HEMA | 66.9 | MAA | 3.1 | 20 | 30.0 | 3500 | 1.2 | 9.7 | 175 |
| 34 | St | 35.0 | HEMA | 58.9 | MAA | 6.1 | 40 | 35.0 | 3500 | 1.2 | 5.7 | 88 |
| 35 | St | 70.0 | HEMA | 16.2 | MAA | 13.8 | 90 | 70.0 | 7000 | 1.2 | 5.1 | 78 |
| 36 | St | 70.0 | HEMA | 7.2 | MAA | 22.8 | 149 | 70.0 | 8000 | 1.2 | 3.1 | 54 |
| 37 | St | 65.0 | HEMA | 12.0 | MAA | 23.0 | 150 | 65.0 | 10000 | 1.2 | 2.8 | 67 |
| 38 | St | 65.0 | HEMA | 11.9 | MAA | 23.1 | 151 | 65.0 | 10000 | 1.2 | 2.8 | 66 |

TABLE 4

Polymer composition and properties of polymer aqueous solution

| Polymer aqueous solution No. | X block Type | Composition ratio (percent by mass) | Type | Composition ratio (percent by mass) | Type | Composition ratio (percent by mass) | Y block Type | Composition ratio (percent by mass) | Type | Composition ratio (percent by mass) |
|---|---|---|---|---|---|---|---|---|---|---|
| 39 | BzMA | 70.0 | HEMA | 23.8 | MAA | 6.2 | — | — | — | — |
| 40 | BzMA | 79.9 | — | — | — | — | MAA | 20.1 | — | — |
| 41 | BzMA | 70.0 | — | — | — | — | HEMA | 23.8 | MAA | 6.2 |
| 42 | BzMA | 70.0 | HEMA | 23.8 | — | — | MAA | 6.2 | — | — |

| Polymer aqueous solution No. | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|
| 39 | 40 | 70.0 | 4000 | 1.2 | 11.3 | 100 |
| 40 | 131 | 79.9 | 10000 | 1.2 | 4.0 | 76 |
| 41 | 40 | 70.0 | 4000 | 1.2 | 11.3 | 100 |
| 42 | 10 | 70.0 | 4000 | 1.2 | 11.3 | 400 |

TABLE 5

Polymer composition and properties of polymer aqueous solution

| Polymer aqueous solution No. | X block Type | Composition ratio (percent by mass) | Y block Type | Composition ratio (percent by mass) | Z block Type | Composition ratio (percent by mass) | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|---|---|---|---|---|---|
| 43 | HEMA | 23.8 | BzMA | 70.0 | MAA | 6.2 | 40 | 70.0 | 4000 | 1.2 | 11.3 | 100 |
| 44 | BzMA | 70.0 | MAA | 6.2 | HEMA | 23.8 | 40 | 70.0 | 4000 | 1.2 | 11.3 | 100 |

TABLE 5-continued

Polymer composition and properties of polymer aqueous solution

| Polymer aqueous solution No. | X block Type | X block Composition ratio (percent by mass) | Y block Type | Y block Composition ratio (percent by mass) | Z block Type | Z block Composition ratio (percent by mass) | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|---|---|---|---|---|---|
| 45 | SMA | 20.0 | nBMA | 40.0 | MTEGMA | 40.0 | 0 | 0 | 4000 | 1.2 | — | — |
| 46 | BzMA | 70.0 | MTEGMA | 23.8 | MAA | 6.2 | 40 | 70.0 | 4000 | 1.2 | 11.3 | 100 |
| 47 | MTEGMA | 70.0 | HEMA | 23.8 | MAA | 6.2 | 40 | 0 | 4000 | 1.2 | 0 | 100 |
| 48 | BzMA | 70.0 | HEMA | 23.8 | MTEGMA | 6.2 | 0 | 70.0 | 4000 | 1.2 | — | — |
| 49 | MAA | 28.0 | PEMA | 47.0 | ETEGMA | 25.0 | 163 | 47.0 | 4000 | 1.2 | 1.7 | 25 |
| 50 | MAA | 29.0 | BzMA | 45.0 | ETEGMA | 26.0 | 170 | 45.0 | 4000 | 1.2 | 1.6 | 24 |
| 51 | IBVE | 54.0 | MEEVE | 30.0 | BzAVEE | 16.0 | 43 | 16.0 | 19700 | 1.2 | 1.0 | 458 |
| 52 | MBOEVE | 48.7 | MEEVE | 39.9 | VOEBA | 11.4 | 31 | 48.7 | 32800 | 1.2 | 4.3 | 1069 |

Preparation of Liquid Composition

Liquid Composition 1

Polymer aqueous solution 1 obtained as described above was mixed having the following composition.

| | |
|---|---|
| Polymer aqueous solution 1 | 8.0 percent by mass |
| Glycerin | 10.0 percent by mass |
| Ethylene glycol | 5.0 percent by mass |
| Polyethylene glycol (number average molecular weight 1,000) (PEG 1000) | 5.0 percent by mass |
| Surfactant: Acetylenol EH (produced by Kawaken Fine Chemicals Co., Ltd.) | 0.5 percent by mass |
| Ion-exchanged water | 71.5 percent by mass |

This was agitated sufficiently to disperse, so that Liquid composition 1 was prepared.

Liquid Compositions 2 to 52

Liquid compositions 2 to 52 were obtained in the same manner as Liquid composition 1 except that Polymer aqueous solution 1 was changed to Polymer aqueous solutions 2 to 52.

Liquid Composition 53

Referring to Example 2 described in Japanese Patent Laid-Open No. 2001-039006, the following components were mixed and agitated sufficiently to disperse.

| | |
|---|---|
| Vinyl acetate based polymer emulsion (minimum film formation temperature: 5° C.) | 10.0 percent by mass |
| Triethylene glycol | 8.0 percent by mass |
| Glycerin | 2.0 percent by mass |
| Triethylene glycol monobutyl ether | 5.0 percent by mass |
| Surfactant: Surfynol 465 (produced by Air Products and Chemicals, Inc.) | 1.0 percent by mass |
| Triethanolamine | 0.5 percent by mass |
| Ion-exchanged water | 73.5 percent by mass |

This was filtrated with a membrane filter having a pore size of 0.5 μm so as to prepare Liquid composition 53.

Liquid Composition 54

Referring to Production example 1 described in Japanese Patent Laid-Open No. 2006-272934, the following components were mixed and agitated at 90° C. for 5 hours, so as to obtain a polymer dispersion.

| | |
|---|---|
| Polyester based polyurethane polymer (acid value: 50 mgKOH/g, weight average molecular weight: 50,000) | 10.0 percent by mass |
| Styrene-methylstyrene-acrylic acid copolymer (weight average molecular weight: 8,000) | 2.0 percent by mass |
| Cross-linking agent (epoxy polymer having a glycidyl ether skeleton) | 8.0 percent by mass |
| Pure water | 80.0 percent by mass |

The thus obtained polymer dispersion was blended with 5.0 percent by mass of 1,2-hexanediol relative to the polymer dispersion. After agitation was performed sufficiently, a heating treatment was performed at 70° C. for 3 days, so as to obtain a heat-treated polymer dispersion. Then, the heat-treated polymer dispersion obtained as described above was mixed having the following composition.

| | |
|---|---|
| Heat-treated polymer dispersion | 5.0 percent by mass |
| Glycerin | 15.0 percent by mass |
| Surfactant: BYK-348 (produced by BYK-Chemie Japan) | 0.5 percent by mass |
| Triethanolamine | 0.9 percent by mass |
| Ion-exchanged water | 78.6 percent by mass |

This was agitated sufficiently to disperse, so that Liquid composition 54 was prepared.

Measurement of Absorbance of Liquid Composition

The maximum absorbance $A_{max}$ and the minimum absorbance $A_{min}$ in a wavelength range of 400 nm to 780 nm of Liquid compositions 1 to 88 were measured with Hitachi double beam spectrophotometer U-2900 (produced by Hitachi High-Technologies Corporation), and the ratio $A_{max}/A_{min}$ was calculated. The results are shown in Table 6.

Preparation of Pigment Dispersion

Preparation of Black Pigment Dispersion

The following components were mixed, and were heated to 70° C. in a water bath, so as to dissolve a polymer dispersing agent under agitation.

| | |
|---|---|
| Polymer dispersing agent: JONCRYL683 (produced by BASF) | 7.0 parts |
| 2-Pyrrolidone | 10.0 parts |
| Potassium hydroxide | 0.95 parts |
| Ion-exchanged water | 67.05 parts |

The resulting solution was blended with 15.0 parts of carbon black (NIPex 160 IQ; produced by Degussa) serving as a black pigment and premixing was performed for 30 minutes. Thereafter, a dispersion treatment (treatment pressure: 150 MPa, treatment pass: 10 passes) was performed by using a very high pressure homogenizer NM2-L2000AR (produced by YOSHIDA KIKAI CO., LTD.), so as to obtain Black pigment dispersion (pigment content was 15.0 percent by mass).

Preparation of Cyan Pigment Dispersion

The following components were mixed, and were heated to 70° C. in a water bath, so as to dissolve a polymer dispersing agent under agitation.

| | |
|---|---|
| Polymer dispersing agent: JONCRYL683 (produced by BASF) | 10.0 parts |
| 2-Pyrrolidone | 10.0 parts |
| Potassium hydroxide | 1.35 parts |
| Ion-exchanged water | 63.65 parts |

The resulting solution was blended with 15.0 parts of C. I. Pigment Blue 15:3 (IRGALITE Blue 8700; produced by Ciba Specialty Chemicals) serving as a cyan pigment, and premixing was performed for 30 minutes. Thereafter, a dispersion treatment (beads used: zirconia beads having a diameter of 0.05 mm, beads filling factor: 70 percent by mass (in terms of bulk specific gravity), the number of revolutions of rotor: 42.1 Hz, dispersion time: 2 hours) was performed by using a beads mill UAM-015 (produced by KOTOBUKI ENGINEERING & MANUFACTURING CO., LTD.), so as to obtain a cyan pigment dispersion (pigment content was 15.0 percent by mass).

Preparation of Magenta Pigment Dispersion

Magenta pigment dispersion (pigment content was 15.0 percent by mass) was prepared in the same manner as the cyan pigment dispersion except that the cyan pigment was changed to C. I. Pigment Red 122 (CROMOPHTAL Pink PT; produced by Ciba Specialty Chemicals) serving as a magenta pigment.

Preparation of Yellow Pigment Dispersion

Yellow pigment dispersion (pigment content was 15.0 percent by mass) was prepared in the same manner as the cyan pigment dispersion except that the cyan pigment was changed to C. I. Pigment Yellow 74 (IRGALITE Yellow GS; produced by Ciba Specialty Chemicals) serving as a yellow pigment.

Preparation of Ink

Preparation of Black Ink

The black pigment dispersion obtained as described above was mixed having the following composition.

| | |
|---|---|
| Black pigment dispersion (pigment content was 15.0 percent by mass) | 20.0 percent by mass |
| Glycerin | 10.0 percent by mass |
| Ethylene glycol | 5.0 percent by mass |
| Polyethylene glycol (average molecular weight was 1,000) | 5.0 percent by mass |
| Acetylene glycol ethylene oxide adduct (produced by Kawaken Fine Chemicals Co., Ltd.) | 0.5 percent by mass |
| Ion-exchanged water | 59.5 percent by mass |

This was agitated sufficiently to disperse, so that a black ink was prepared.

Preparation of Cyan Ink

A cyan ink was obtained in the same manner as the black ink except that the black pigment dispersion was changed to the cyan pigment dispersion.

Preparation of Magenta Ink

A manta ink was obtained in the same manner as the black ink except that the black pigment dispersion was changed to the magenta pigment dispersion.

Preparation of Yellow Ink

A yellow ink was obtained in the same manner as the black ink except that the black pigment dispersion was changed to the yellow pigment dispersion.

Preparation of Reaction Liquid

The following individual components were mixed and agitated sufficiently.

| | |
|---|---|
| Diethylene glycol | 10.0 percent by mass |
| Methyl alcohol | 5.0 percent by mass |
| Magnesium nitrate | 3.0 percent by mass |
| Acetylene glycol ethylene oxide adduct (produced by Kawaken Fine Chemicals Co., Ltd.) | 0.1 percent by mass |
| Ion-exchanged water | 81.9 percent by mass |

This was filtrated so as to prepare a reaction liquid.

Evaluation

Evaluation of Liquid Composition

The evaluation of the following "Ejection stability of liquid composition" and "Storage stability of liquid composition" was performed by using an ink jet recording apparatus PIXUS Pro9500 (produced by CANON KABUSHIKI KAISHA). Regarding each evaluation, recoding was performed on Canon Photo Paper Glossy Gold GL-101 (produced by CANON KABUSHIKI KAISHA), where a recording mode was "Canon Photo Paper Glossy Gold Standard mode". The recording condition was specified to be temperature: 23° C. and relative humidity: 55%. Regarding the above-described ink jet recording apparatus, the condition in which four droplets of 4 pL of ink were applied in a unit region of $\frac{1}{600}$ inch×$\frac{1}{600}$ inch, where the resolution was 600 dpi×600 dpi, was defined as a recording duty of 100%. Regarding the evaluation criteria of the following "Ejection stability of liquid composition" and "Storage stability of liquid composition", A and B were favorable levels, and C to E were unacceptable levels.

Ejection Stability of Liquid Composition

Each of the liquid compositions obtained as described above was filled into a liquid cartridge, and the liquid cartridge was mounted on the above-described ink jet recording apparatus. Then, solid images (image with recording duty of 100%) of 17 cm×25 cm were printed on GL-101. Regarding the recorded articles obtained at this time, the 20-degree glossiness of the solid image on the basis of JIS Z 8741 was measured by using a glossmeter (Handy Gloss Meter PG-1M; produced by NIPPON DENSHOKU INDUSTRIES CO., LTD.). The ejection stability of the liquid composition was evaluated by calculating the ratio $DR=GR_2/GR_1$ of $GR_2$ to $GR_1$, where the 20-degree glossiness of the hundredth sheet was represented by $GR_2$ and the 20-degree glossiness of the image of the first sheet was represented by $GR_1$. If ejection becomes unstable, a polymer layer formed by the liquid composition becomes nonuniform and, thereby, the glossiness of the image is reduced. That is, as the value of DR approaches 1.0, it can be said that the ejection stability of the liquid composition is high because it is indicated that the polymer layer of the hundredth image is formed uniformly in a manner similar to the polymer layer of the first image. The evaluation criteria of the ejection stability of the liquid composition were as described below. The evaluation results are shown in Table 6.

A: 0.90<DR
B: 0.85<DR≦0.90
C: 0.60<DR≦0.85
D: 0.50<DR≦0.60
E: DR≦0.50 or there was faint streaking in the solid image Storage Stability of Liquid Composition Each of the liquid compositions obtained as described above was stored at 60° C. for one month. Each of the liquid compositions before and after storage test was filled into a liquid cartridge, and the liquid cartridge was mounted on the above-described ink jet recording apparatus. Then, solid images (image with recording duty of 100%) of 17 cm×25 cm were printed on GL-101. Regarding the recorded articles obtained at this time, the 20-degree glossiness of the solid image on the basis of JIS Z 8741 was measured by using the glossmeter (Handy Gloss Meter PG-1M; produced by NIPPON DENSHOKU INDUSTRIES CO., LTD.). The storage stability of the liquid composition was evaluated by calculating the ratio $ST=GR_3/GR_1$ of $GR_3$ to $GR_1$, where the 20-degree glossiness of the image by using the liquid composition after the storage test was represented by $GR_3$ and the 20-degree glossiness of the image by using the liquid composition before the storage test was represented by $GR_1$. If storage of the liquid composition becomes unstable due to the storage test, a formed polymer layer may become nonuniform and the reflectance may be different depending on places because of presence of aggregates and hydrolyzed polymers, so that the glossiness of the image is reduced. That is, as the value of ST approaches 1.0, it can be said that occurrences of aggregation, hydrolysis, and the like of the polymer are at a low level and, therefore, the storage stability of the liquid composition is high because it is indicated that the polymer layer of the image by using the liquid composition after the storage test is formed uniformly in a manner similar to the polymer layer of the image by using the liquid composition before the storage test. The evaluation criteria of the storage stability of the liquid composition were as described below. The evaluation results are shown in Table 6.

A: 0.90<ST
B: 0.85<ST≦0.90
C: 0.60<ST≦0.85
D: 0.50<ST≦0.60
E: ST≦0.50 or there was faint streaking in the solid image Evaluation of Set of Liquid Composition and Ink The evaluation of the following "Glossiness of image" and "Gloss unevenness of image" was performed by using an ink jet recording apparatus PIXUS Pro9500 (produced by CANON KABUSHIKI KAISHA). Regarding each evaluation, recoding was performed on Canon Photo Paper Glossy Gold GL-101 (produced by CANON KABUSHIKI KAISHA), where a recording mode was "Canon Photo Paper Glossy Gold Standard mode". The recording condition was specified to be temperature: 23° C. and relative humidity: 55%. Regarding the evaluation criteria of the following "Glossiness of image" and "Gloss unevenness of image", A and B were favorable levels, and C to E were unacceptable levels.

Glossiness of Image

Each of the inks and the liquid compositions obtained as described above was filled into a liquid cartridge, a set of the combination shown in Table 6 was prepared, and the liquid cartridges were mounted on the above-described ink jet recording apparatus. Then, an image (3 cm×3 cm) with an ink recording duty of 50% was recorded on GL-101, and the liquid composition was applied with a recording duty of 50% in such a way as to be superposed on the image. Regarding the image obtained at this time, the image clarity GC of the image on the basis of JIS K 7105 was measured by using an image clarity measuring apparatus (GP1-S; produced by OPTEC CO., LTD.). In this regard, larger image clarity GC refers to higher glossiness of the image. The evaluation criteria of the glossiness of the image were as described below. The evaluation results are shown in Table 6.

A: 60≦GC
B: 53≦GC<60
C: 45≦GC<53
D: 30≦GC<45
E: GC<30 or there was faint streaking in the solid image Gloss Unevenness of Image Each of the inks and the liquid compositions obtained as described above was filled into a liquid cartridge, a set of the combination shown in Table 6 was prepared, and the liquid cartridges were mounted on the above-described ink jet recording apparatus. Then, 11 images (3 cm×3 cm) with an ink recording duty of 0% to 100% (in 10% steps) were recorded side by side on one sheet of GL-101, and the liquid composition was applied with a recording duty of 50% in such a way as to be superposed on each of the images. Regarding each of the 11 images obtained at this time, the image clarity GC of the image on the basis of JIS K 7105 was measured by using an image clarity measuring apparatus (GP1-S; produced by OPTEC CO., LTD.), and the standard deviation SD of the image clarity of the 11 images was determined. In this regard, smaller standard deviation SD refers to reduced gloss unevenness of the image. The evaluation criteria of the gloss unevenness of the image were as described below. The evaluation results are shown in Table 6.

A: SD<5
B: 5≦SD<7
C: 7≦SD<13
D: 13≦SD<30
E: 30<SD or there was faint streaking in the solid image

TABLE 6

Combination of set of liquid composition and ink and evaluation result

| | Liquid composition | | | | Evaluation result | | | |
|---|---|---|---|---|---|---|---|---|
| Example | Liquid composition No. | Polymer aqueous solution No. | Absorbance ratio | Type of ink combined with liquid composition | Ejection stability of liquid composition | Storage stability of liquid composition | Glossiness of image | Gloss unevenness of image |
| Example 1 | Liquid composition 1 | 1 | 1.2 | Black ink | A | A | A | A |
| Example 2 | Liquid composition 3 | 3 | 1.1 | Black ink | A | A | A | A |
| Example 3 | Liquid composition 4 | 4 | 1.1 | Black ink | A | A | A | A |
| Example 4 | Liquid composition 5 | 5 | 1.1 | Black ink | A | A | A | A |
| Example 5 | Liquid composition 6 | 6 | 1.1 | Black ink | A | A | A | A |
| Example 6 | Liquid composition 9 | 9 | 1.1 | Black ink | A | A | A | A |

TABLE 6-continued

Combination of set of liquid composition and ink and evaluation result

| Example | Liquid composition No. | Polymer aqueous solution No. | Absorbance ratio | Type of ink combined with liquid composition | Ejection stability of liquid composition | Storage stability of liquid composition | Glossiness of image | Gloss unevenness of image |
|---|---|---|---|---|---|---|---|---|
| Example 7 | Liquid composition 10 | 10 | 1.1 | Black ink | A | A | A | A |
| Example 8 | Liquid composition 11 | 11 | 1.1 | Black ink | A | A | A | A |
| Example 9 | Liquid composition 12 | 12 | 1.1 | Black ink | A | A | A | A |
| Example 10 | Liquid composition 14 | 14 | 1.1 | Black ink | A | A | A | A |
| Example 11 | Liquid composition 15 | 15 | 1.1 | Black ink | A | A | A | A |
| Example 12 | Liquid composition 16 | 16 | 1.1 | Black ink | A | A | A | A |
| Example 13 | Liquid composition 17 | 17 | 1.1 | Black ink | A | A | A | A |
| Example 14 | Liquid composition 18 | 18 | 1.1 | Black ink | A | A | A | A |
| Example 15 | Liquid composition 19 | 19 | 1.1 | Black ink | B | B | B | B |
| Example 16 | Liquid composition 22 | 22 | 1.1 | Black ink | A | A | A | A |
| Example 17 | Liquid composition 27 | 27 | 1.1 | Black ink | A | A | A | A |
| Example 18 | Liquid composition 28 | 28 | 1.1 | Black ink | A | A | A | A |
| Example 19 | Liquid composition 29 | 29 | 1.1 | Black ink | A | A | A | A |
| Example 20 | Liquid composition 30 | 30 | 1.1 | Black ink | A | A | A | A |
| Example 21 | Liquid composition 33 | 33 | 1.1 | Black ink | A | A | A | A |
| Example 22 | Liquid composition 34 | 34 | 1.1 | Black ink | A | A | A | A |
| Example 23 | Liquid composition 35 | 35 | 1.1 | Black ink | A | A | A | A |
| Example 24 | Liquid composition 1 | 1 | 1.2 | Cyan ink | A | A | A | A |
| Example 25 | Liquid composition 1 | 1 | 1.2 | Magenta ink | A | A | A | A |
| Example 26 | Liquid composition 1 | 1 | 1.2 | Yellow ink | A | A | A | A |
| Comparative example 1 | Liquid composition 2 | 2 | 1.1 | Black ink | A | A | D | D |
| Comparative example 2 | Liquid composition 7 | 7 | 1.1 | Black ink | C | C | A | A |
| Comparative example 3 | Liquid composition 8 | 8 | 1.1 | Black ink | A | A | D | D |
| Comparative example 4 | Liquid composition 13 | 13 | 1.1 | Black ink | C | C | A | A |
| Comparative example 5 | Liquid composition 20 | 20 | 1.1 | Black ink | C | A | D | D |
| Comparative example 6 | Liquid composition 21 | 21 | 1.1 | Black ink | C | A | A | C |
| Comparative example 7 | Liquid composition 23 | 23 | 1.1 | Black ink | A | A | C | C |
| Comparative example 8 | Liquid composition 24 | 24 | 1.1 | Black ink | A | A | C | C |
| Comparative example 9 | Liquid composition 25 | 25 | 1.1 | Black ink | C | C | C | C |
| Comparative example 10 | Liquid composition 26 | 26 | 1.1 | Black ink | A | A | C | D |
| Comparative example 11 | Liquid composition 31 | 31 | 1.1 | Black ink | C | C | A | A |
| Comparative example 12 | Liquid composition 32 | 32 | 1.1 | Black ink | C | C | A | A |
| Comparative example 13 | Liquid composition 36 | 36 | 1.1 | Black ink | A | A | A | C |
| Comparative example 14 | Liquid composition 37 | 37 | 1.1 | Black ink | A | A | B | C |
| Comparative example 15 | Liquid composition 38 | 38 | 1.1 | Black ink | A | A | B | C |
| Comparative example 16 | Liquid composition 39 | 39 | 1.2 | Black ink | E | E | D | E |
| Comparative example 17 | Liquid composition 40 | 40 | 1.3 | Black ink | C | C | E | E |
| Comparative example 18 | Liquid composition 41 | 41 | 1.3 | Black ink | E | E | D | D |
| Comparative example 19 | Liquid composition 42 | 42 | 1.3 | Black ink | D | C | E | E |
| Comparative example 20 | Liquid composition 43 | 43 | 1.3 | Black ink | D | D | E | E |
| Comparative example 21 | Liquid composition 44 | 44 | 1.3 | Black ink | E | E | D | D |
| Comparative example 22 | Liquid composition 45 | 45 | 1.3 | Black ink | E | E | E | E |
| Comparative example 23 | Liquid composition 46 | 46 | 1.3 | Black ink | C | C | D | E |
| Comparative example 24 | Liquid composition 47 | 47 | 1.3 | Black ink | E | D | E | E |
| Comparative example 25 | Liquid composition 48 | 48 | 1.3 | Black ink | E | E | D | E |

TABLE 6-continued

Combination of set of liquid composition and ink and evaluation result

| | Liquid composition | | | | Evaluation result | | | |
|---|---|---|---|---|---|---|---|---|
| Example | Liquid composition No. | Polymer aqueous solution No. | Absorbance ratio | Type of ink combined with liquid composition | Ejection stability of liquid composition | Storage stability of liquid composition | Glossiness of image | Gloss unevenness of image |
| Comparative example 26 | Liquid composition 49 | 49 | 1.3 | Black ink | D | D | E | E |
| Comparative example 27 | Liquid composition 50 | 50 | 1.3 | Black ink | D | D | E | E |
| Comparative example 28 | Liquid composition 51 | 51 | 1.3 | Black ink | E | E | E | E |
| Comparative example 29 | Liquid composition 52 | 52 | 1.3 | Black ink | E | E | D | D |
| Comparative example 30 | Liquid composition 53 | — | 1.8 | Black ink | E | E | E | E |
| Comparative example 31 | Liquid composition 54 | — | 1.8 | Black ink | E | E | E | E |

Evaluation of Set of Liquid Composition, Reaction Liquid, and Ink

Each of Liquid composition 1, the inks (black, cyan, magenta, yellow), and the reaction liquid obtained as described above was filled into a liquid cartridge in combination shown in Table 7. The liquid cartridges were mounted on an ink jet recording apparatus PIXUS Pro9500 (produced by CANON KABUSHIKI KAISHA), and recording was performed on cast coated paper and mirror coat•gold paper (basis weight was 104.7 g/m²) (produced by Oji Paper Co., Ltd.). At this time, Liquid composition 1, in Example 27, or liquid composition 1 and the reaction liquid, in Example 28, were recorded in such a way as to be superposed on an image (3 cm×3 cm) obtained by the inks. The recording duties of the liquid composition, the ink, and the reaction liquid were as shown in Table 7. Each image was used and the following evaluation was performed. The recording condition was specified to be temperature: 23° C. and relative humidity: 55%.

Glossiness of Image

Regarding the recorded articles obtained as described above, the 20-degree glossiness GV of the image on the basis of JIS Z 8741 was measured by using a glossmeter (Handy Gloss Meter PG-1M; produced by NIPPON DENSHOKU INDUSTRIES CO., LTD.). The evaluation criteria of the glossiness of the image were as described below. Regarding the following evaluation criteria of the glossiness of the image, A to C were favorable levels, and D and E were unacceptable levels. The evaluation results are shown in Table 7.

A: 40≦GV
B: 30≦GV<40
C: 20≦GV<30
D: 10≦GV<20
E: GV<10 or there was faint streaking in the solid image Scratch Resistance of Image Regarding the recorded articles obtained as described above, the scratch resistance of each recorded portion was measured by using a surface measurement machine (TRIBO-GEAR TYPE: 14FW). The test condition was on the basis of JIS K5600-5-5, the load was 500 gf, the stroke of scratch test was 40 mm, and the sweep velocity was 40 mm/s, and an acrylic ball having an outside diameter of 2 mm was used as a probe. The recorded article after sweeping was observed visually. The evaluation criteria of the scratch resistance of the image were as described below. Regarding the following evaluation criteria of the scratch resistance of the image, A and B were favorable levels, and C was an unacceptable level. The evaluation results are shown in Table 7.

A: The swept portion was not scraped off.
B: A part of the swept portion was scraped off, so that a part of the base paper was exposed.
C: Most of the swept portion was scraped off and the base paper was exposed.

TABLE 7

Combination of set of liquid composition, reaction liquid, and ink and evaluation result

| | | | Recording duty of ink (%) | | | | Evaluation result | |
|---|---|---|---|---|---|---|---|---|
| Example | Recording duty of Liquid composition 1 (%) | Recording duty of reaction liquid (%) | Black ink | Cyan ink | Magenta ink | Yellow ink | Glossiness of image | Scratch resistance of image |
| Example 27 | 50 | 25 | 50 | 50 | 50 | 50 | A | A |
| Example 28 | 50 | — | 50 | 50 | 50 | 50 | C | B |
| Comparative example 32 | — | — | 50 | 50 | 50 | 50 | E | C |

According to the examples, an ink jet liquid composition exhibiting excellent storage stability and ejection stability and being capable of obtaining an image exhibiting high glossiness and reduced gloss unevenness is provided. Furthermore, a set may be provided by using the above-described liquid composition, and a liquid cartridge, and an ink jet recording method may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-193842 filed Aug. 31, 2010, which is hereby incorporated by reference herein in its entirety.

What is claimed is:

1. An ink jet liquid composition used in combination with an ink comprising a pigment,
wherein a ratio $A_{max}/A_{min}$ of the maximum absorbance $A_{max}$ to the minimum absorbance $A_{min}$ of the liquid composition in a wavelength range of 400 nm to 780 nm is 1.0 or more and 2.0 or less,
the liquid composition contains an ABC triblock polymer,
the ABC triblock polymer is formed from an A block having an aryl group, a B block having a unit represented by the following general formula (1), and a C block having a unit represented by the following general formula (2),
an acid value of the ABC triblock polymer is 20 mgKOH/g or more and less than 150 mgKOH/g,
the ratio of the number average molecular weight of the ABC triblock polymer to the acid value of the ABC triblock polymer is 50 or more and 200 or less,
the proportion (percent by mass) of the A block in the ABC triblock polymer is 20.0 percent by mass or more and 80.0 percent by mass or less relative to a total mass of the ABC triblock polymer, and
the proportion (percent by mass) of the A block in the ABC triblock polymer is 5.0 times or more and 15.0 times or less the proportion (percent by mass) of units derived from all acidic monomers contained in the ABC triblock polymer,

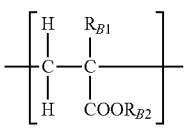

General formula (1)

in the general formula (1), $R_{B1}$ represents a hydrogen atom or a methyl group and $R_{B2}$ represents an alkyl group having the carbon number of 1 to 8, a cycloalkyl group having the carbon number of 4 to 8, or a hydroxy alkyl group having the carbon number of 2 to 8, and

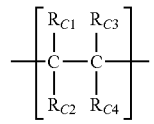

General formula (2)

in the general formula (2), at least one of $R_{C1}$ to $R_{C4}$ is a —COOH group, an —$R_{C5}$—COOH group, or a salt thereof, the remainder is a hydrogen atom, an alkyl group having the carbon number of 1 to 8, or a cycloalkyl group having the carbon number of 4 to 8, and $R_{C5}$ is an alkylene group having the carbon number of 1 to 5.

2. The ink jet liquid composition according to claim 1, wherein the number average molecular weight of the ABC triblock polymer is 1,000 or more and 30,000 or less.

3. The ink jet liquid composition according to claim 1, wherein the ABC triblock polymer has a molecular weight distribution satisfying 1.0≦(weight average molecular weight)/(number average molecular weight)≦2.0.

4. A liquid cartridge comprising a liquid storage portion to store a liquid composition, wherein the liquid composition stored in the liquid storage portion is the ink jet liquid composition according to claim 1.

5. A set comprising an ink containing a pigment and a liquid composition, wherein the liquid composition is the ink jet liquid composition according to claim 1.

6. The set according to claim 5, further comprising a reaction liquid to aggregate the ABC triblock polymers contained in the liquid composition.

7. An ink jet recording method comprising the steps of:
ejecting an ink containing a pigment by an ink jet method; and
ejecting a liquid composition by the ink jet method,
wherein the liquid composition is the ink jet liquid composition according to claim 1.

8. The ink jet recording method according to claim 7, wherein the ejecting of the liquid composition is performed after the ejecting of the ink.

9. The ink jet recording method according to claim 7, further comprising the step of applying a reaction liquid to aggregate the ABC triblock polymers contained in the liquid composition.

* * * * *